(12) United States Patent
Thomas

(10) Patent No.: US 7,684,114 B2
(45) Date of Patent: Mar. 23, 2010

(54) SCOPE WITH IMPROVED MAGNIFICATION SYSTEM

(75) Inventor: Mark Thomas, Sisters, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 0 days.

(21) Appl. No.: 11/339,992

(22) Filed: Jan. 26, 2006

(65) Prior Publication Data

US 2006/0262391 A1 Nov. 23, 2006

Related U.S. Application Data

(60) Provisional application No. 60/647,174, filed on Jan. 26, 2005, provisional application No. 60/647,686, filed on Jan. 27, 2005.

(51) Int. Cl.
G02B 23/00 (2006.01)

(52) U.S. Cl. .................................. 359/421; 359/422

(58) Field of Classification Search ................ 359/421, 359/422, 432; 42/111, 119, 130
See application file for complete search history.

(56) References Cited

U.S. PATENT DOCUMENTS

| | | | |
|---|---|---|---|
| 1,464,655 A | 8/1923 | Heinrich |
| 2,126,335 A | 8/1938 | Langsner |
| 2,207,124 A | 7/1940 | Kellmorgen |
| 2,479,792 A | 8/1949 | Tackaberry |
| 2,997,916 A | 8/1961 | Friedman et al. |
| 3,045,545 A | 7/1962 | Korones et al. |
| 3,320,671 A | 5/1967 | Rickert et al. |
| 3,423,146 A | 1/1969 | Weaver |
| 3,431,652 A | 3/1969 | Leatherwood |
| 3,684,376 A | 8/1972 | Lessard |
| 3,696,516 A | 10/1972 | Thompson |
| 3,782,822 A | 1/1974 | Spencer |
| 3,902,251 A | 9/1975 | Ross |
| 3,918,791 A | 11/1975 | Perry |
| 3,948,587 A | 4/1976 | Rubbert |
| 3,967,876 A | 7/1976 | Steek |
| 4,072,396 A | 2/1978 | Ross |
| 4,172,634 A | 10/1979 | Thompson |
| 4,200,355 A | 4/1980 | Williams, Jr. |
| 4,247,161 A | 1/1981 | Unertl, Jr. |
| 4,255,013 A | 3/1981 | Allen |
| 4,389,791 A | 6/1983 | Ackerman |

(Continued)

FOREIGN PATENT DOCUMENTS

EP 0 234 180 9/1987

OTHER PUBLICATIONS

International Search Report and Written Opinion for PCT Application No. PCT/US06/02910 dated Oct. 4, 2007.

(Continued)

*Primary Examiner*—Joshua L Pritchett
(74) *Attorney, Agent, or Firm*—Stoel Rives LLP

(57) ABSTRACT

Various embodiments described herein include a scope for a firearm having a large range of zoom. The scope comprising a movable zoom selector for adjusting magnification of an image viewed through the scope. The scope further includes an objective, an ocular, and an erector assembly positioned between the objective and ocular. The erector assembly includes at least three optical elements movable relative to one another in response to operation of the zoom selector.

32 Claims, 23 Drawing Sheets

U.S. PATENT DOCUMENTS

| | | | |
|---|---|---|---|
| D275,495 S | 9/1984 | Tominaga | |
| 4,469,396 A * | 9/1984 | Neil | 359/353 |
| 4,643,542 A | 2/1987 | Gibson | |
| 4,789,231 A | 12/1988 | Shimizu | |
| 4,982,502 A | 1/1991 | Weyrauch | |
| D342,537 S | 12/1993 | Olson | |
| 5,500,769 A | 3/1996 | Betensky | |
| 5,513,440 A | 5/1996 | Murg | |
| 5,771,595 A * | 6/1998 | Bell | 42/122 |
| 5,813,107 A | 9/1998 | Chen | |
| 5,971,239 A * | 10/1999 | Marable | 224/150 |
| 6,005,711 A * | 12/1999 | Mai et al. | 359/424 |
| 6,005,771 A | 12/1999 | Bjorndahl et al. | |
| D421,286 S | 2/2000 | Tucker | |
| 6,104,531 A | 8/2000 | Dross | |
| 6,469,829 B2 | 10/2002 | Otteman | |
| 6,816,305 B2 | 11/2004 | Regan et al. | |
| 2006/0262391 A1 | 11/2006 | Thomas | |

OTHER PUBLICATIONS

Weaver-Scopes for 1978, catalog excerpts for W. R. Weaver Co., 3 pp.

* cited by examiner

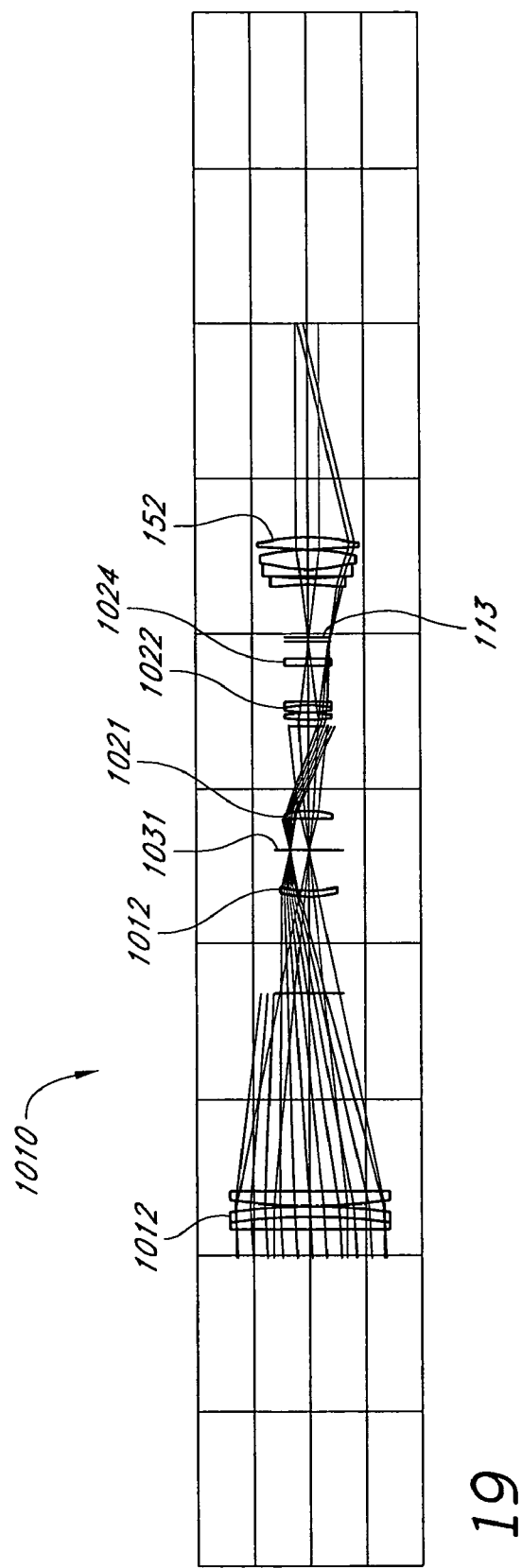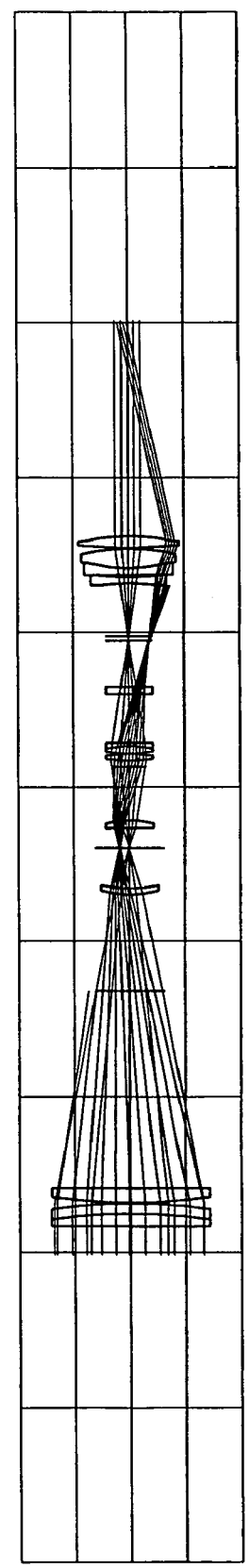
FIG. 19
FIG. 20

SCOPE WITH IMPROVED MAGNIFICATION SYSTEM

PRIORITY APPLICATIONS

This application claims priority to U.S. Provisional Patent Application No. 60/647,174 entitled "Scope with Improved Magnification System" filed Jan. 26, 2005, which is incorporated herein by reference in its entirety, as well as U.S. Provisional Patent Application No. 60/647,686 entitled "Adjustable Optical Sighting Apparatus and Methods" filed Jan. 27, 2005.

BACKGROUND

1. Field of the Invention

The present teachings relate to a scope for mounting on a firearm to provide a gun sight. Such a scope may have a zoom capability.

2. Description of the Related Art

Scopes are of interest for practical applications in various fields. Scopes are often used as aiming devices, for example, for firearms like rifles or handguns. Scopes can be mounted to the firearm so that the user can peer through the scope to view the target up close.

A scope, otherwise known as a terrestrial telescope or landscape telescope, comprises an objective lens and an ocular lens or eyepiece. The combination of the objective and the ocular alone create an inverted image of the target in the viewer's eye. Accordingly, scopes are customarily outfitted with erector systems between the objective and ocular for inverting the image such that the target appears erect as seen by the viewer. The objective, ocular, and erector are generally disposed in a body that protects the optics.

Conventional scopes that are mounted on a firearm typically have a rotatable zoom ring disposed on the outside of the scope. The zoom ring can be rotated to adjust optics within the scope that enlarge or reduce the apparent distance to the object viewed through the scope. Thus, when the user employs the scope to aim a firearm at a target, the user can rotate the zoom ring to adjust how close the object appears for easier observation of the target.

SUMMARY

Various embodiments described herein comprise scopes with an enlarged range of zoom. One embodiment of the invention, for example, comprises a scope for sighting. The scope comprises an objective, an ocular, and an erector assembly positioned therebetween. The erector assembly comprises at least three erector optical elements that are movable relative to one another. The at least three erector optical elements comprise a first lens, second lens, and third lens. The erector assembly further comprises housing with at least three cams, each of the three cams is guide one of the optical elements. In some embodiments, the third lens is a negative lens. In some embodiments, the first lens, second lens, and third lens are mounted in carriages which are slidably mounted in a corresponding cam of the housing. In some embodiments, one or more of the erector optical elements are movable when the zoom assembly is operated.

Another embodiment of the invention comprises a scope for a firearm. The scope comprises an objective and an ocular. The scope also has an erector assembly that comprises a collector lens, zoom lens, and Barlow lens. The erector assembly comprises a housing with at least three cams, each of the three cams is configured to guide one of the collector lens, zoom lens, and Barlow lens. The collector lens, zoom lens, and Barlow lens can each comprise one or more lenses. In some embodiments, the collector lens, zoom lens, and Barlow lens are mounted in carriages which are slidably mounted in corresponding cams of the housing. In some embodiments, the collector lens, zoom lens, and Barlow lens are movable relative to one another when the a zoom selector ring is operated. In some embodiments, the scope has more than about 4× zoom. In some embodiments, the scope has more than 4× zoom, about 5× zoom, about 6× zoom, about 7× zoom, and ranges encompassing such zooms.

In some embodiments, a scope for sighting comprises a movable zoom selector for adjusting magnification of an image viewed through the scope. The scope also comprises an objective, an ocular, and an erector assembly. The erector assembly is positioned between the objective and ocular. The erector assembly comprises at least three optical elements movable relative to one another in response to operation of the zoom selector. In some variations, the at least three optical elements cooperate to provide at least 4× zoom. In some variations, the at least three optical elements cooperate to provide at least 5× zoom. In some variations, the at least three optical elements span a distance that is equal to or less than about 5 inches when providing 5× zoom. In some variations, the at least three optical elements span a distance that is equal to or less than about 4 inches when providing 5× zoom. In some variations, the scope further comprises at least three carriages supporting the at least three optical elements. The three carriages are longitudinally translated in response to operation of the zoom selector.

In some embodiments, a scope for sighting comprises a movable zoom selector for adjusting magnification of an image viewed through the scope. The scope also comprises an objective, an ocular, and an erector assembly. The erector assembly is positioned between the objective and ocular. The erector assembly comprises at least three optical elements. At least three separate carriages support the at least three optical elements. A tube has at last three cams. The at least three separate carriages are slidably engaged to the at least three cams such that rotation of the tube induces longitudinal movement of the carriages and the optical elements.

In some embodiments, a scope for a firearm comprises an elongate main body and an erector assembly. The erector assembly is disposed within the main body. The erector assembly comprises a collector lens, a zoom lens, and a Barlow lens. An erector housing defines at least three elongate cams such that movement of the collector lens, zoom lens, and Barlow lens are each guided by one of the elongate cams. In some variations, the scope further comprises a collector lens carriage carrying the collector lens, a zoom lens carriage carrying the zoom lens, and a Barlow lens carriage carrying the Barlow lens. The collector lens carriage, zoom lens carriage, and Barlow lens carriage are guided by the corresponding cams.

BRIEF DESCRIPTION OF THE DRAWINGS

FIGS. 19-23 show ray traces through the scope of FIG. 18 set for different amounts of zoom.

DETAILED DESCRIPTION OF CERTAIN PREFERRED EMBODIMENT

Figure 1:
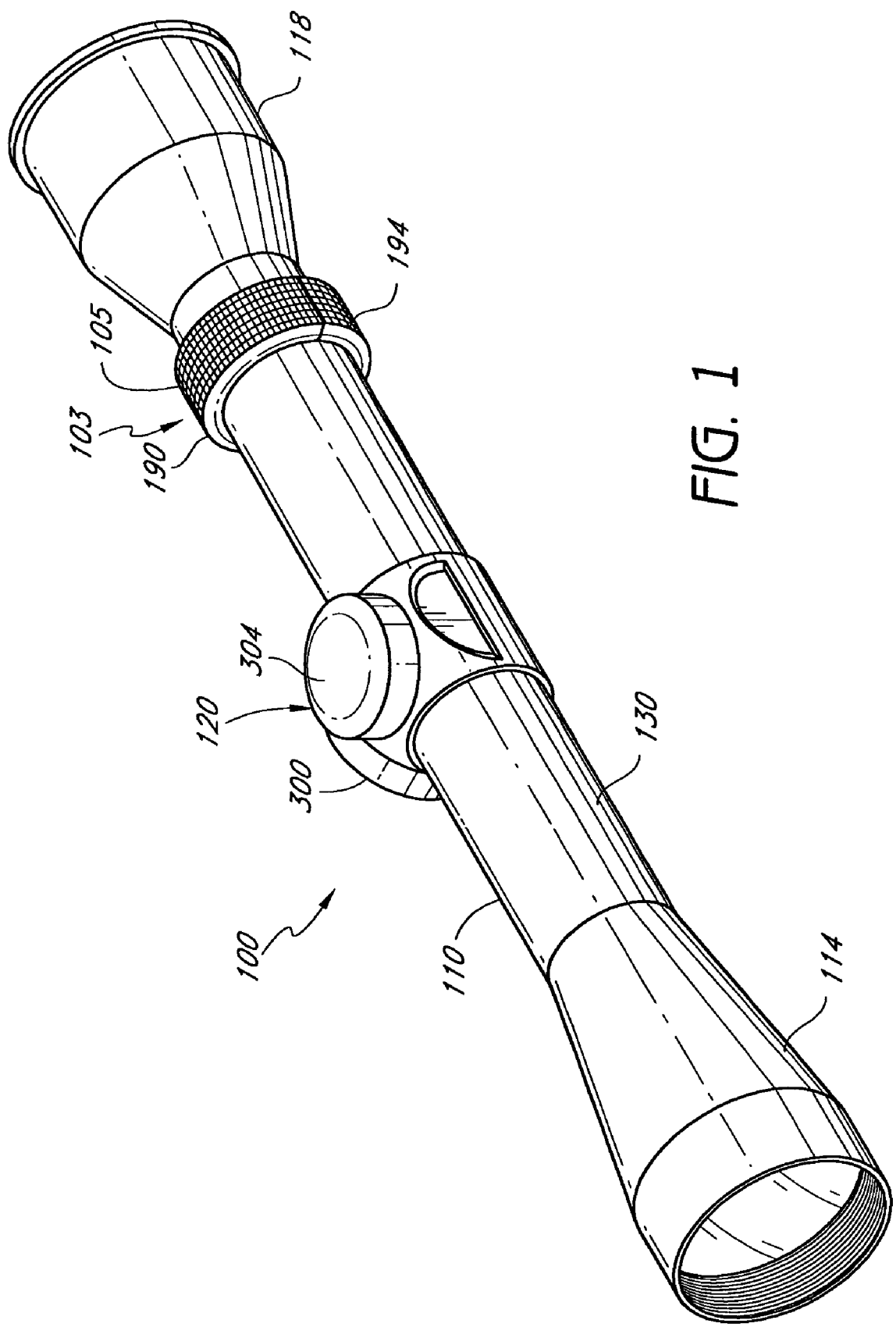
FIG. 1 is a perspective view of a scope having a positioning system for adjusting windage and elevation as well as a zoom assembly for providing zoom.

These and other aspects, advantages, and features of the present teachings will become apparent from the following detailed description and with reference to the accompanying drawings. In the drawings, similar elements have similar reference numerals. To assist the description of the scope and its components, the following coordinate terms are used. The terms proximal and distal, which are used to describe the disclosed embodiments, are used consistently with the description of the exemplary applications. The terms proximal and distal are used in reference to the head of the user looking through the scope. That is, proximal components are nearer to the user than distal components.

FIG. 1 illustrates a scope 100 that has a zoom assembly 103 for providing selectable zoom thereby controlling the apparent distance to an object viewed through the scope. The zoom assembly 103 includes the zoom selector ring 105 that is disposed along and surrounds a main body 110 of the scope 100. The zoom selector ring 105 can be adjusted, e.g., rotated, to zoom in or zoom out, thereby reducing or enlarging the object viewed through the scope 100.

As shown in FIG. 1, in certain preferred embodiments the zoom selector ring 105 is disposed rearward on the main tube 110. The main body 110 has a widened objective end 114 and a widened eyepiece end 118 housing an objective and an eyepiece, respectively. In the illustrated embodiment, the widened eyepiece end 118 is at the proximal end and the widened objective end 114 is at the distal end of the main body 110. The scope 100 also includes a positioning system 120 for manipulating optics contained within the scope 100 to account for windage and/or elevation. The positioning system 120 includes elevation and windage dials 300, 304 for adjusting the elevation and windage as described in more detail below. In the illustrated embodiment, the zoom selector ring 105 is located between the eyepiece end 114 and the positioning system 120. However, the zoom selector ring 105 can be located at any suitable position along the scope 100 for adjusting optics of the scope to achieve the desired amount of zoom. Although not illustrated, the scope 100 can be mounted to a firearm (e.g., a rifle, a handgun, etc.) or any other device (e.g., a crossbow or a bow) that a user aims during operation.

Figure 2:
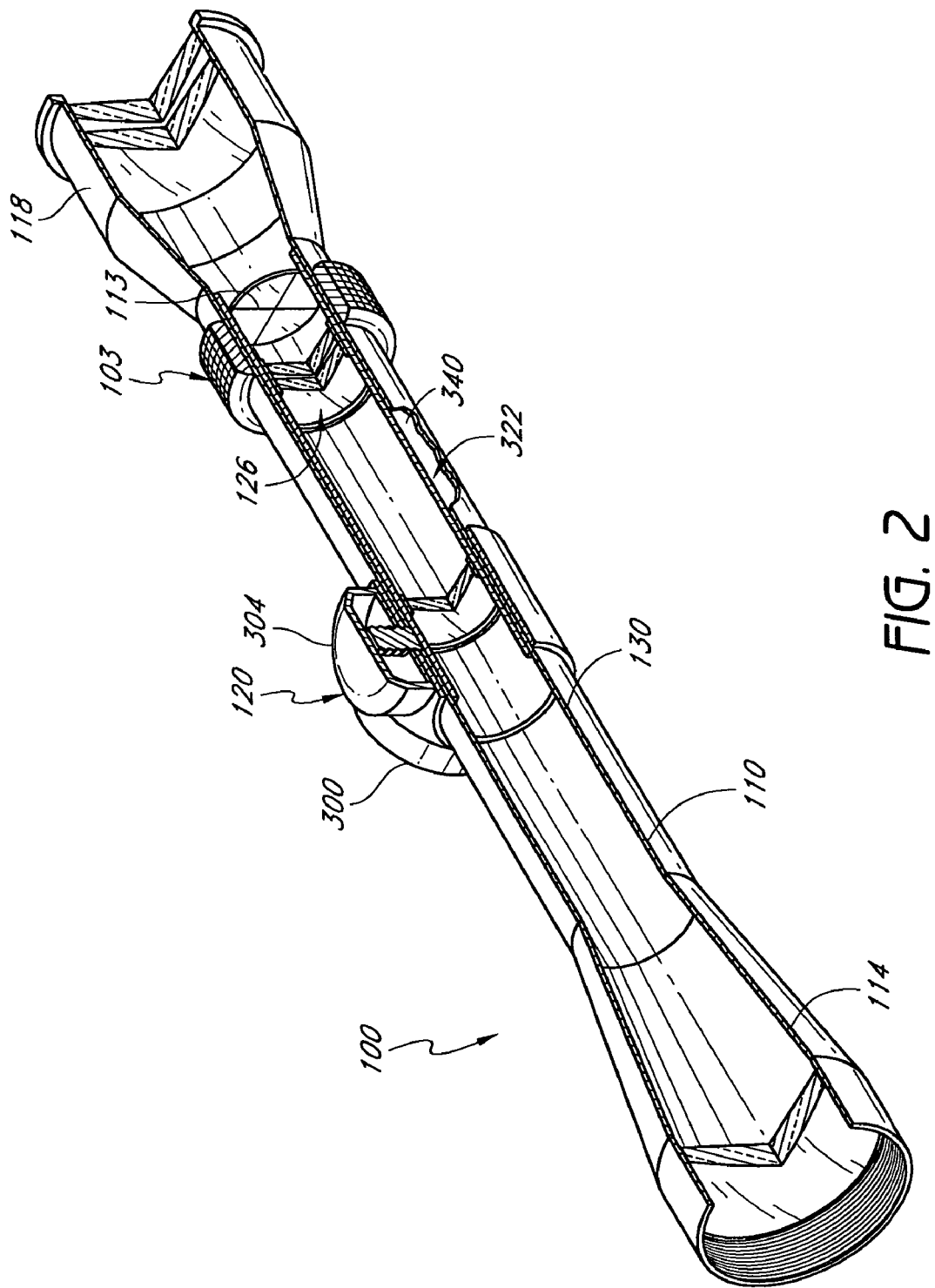
FIG. 2 is a perspective cutaway view of the scope of FIG. 1 illustrating an objective, an erector assembly, and an eyepiece in the scope.

FIG. 2 is a perspective cutaway view of the scope 100 of FIG. 1. As shown, the main body 110 contains an optical train 126 through which light can propagate to provide an image to the observer using the scope 100. In various preferred embodiments, the optical train 126 comprises a plurality of lenses including the objective and eyepiece referred to above and discussed more fully below. In the illustrated embodiment, a portion of the lenses can be selectively longitudinally displaced with respect to each other by using the zoom selector assembly 103 to obtain the desired amount of zoom and/or transversely displaced by using the positioning system 120 to account for windage and elevation. Accordingly, the observer can operate the zoom selector assembly 103 and the positioning system 120 to selectively define the interrelationship between one or more of the lenses of the optical train 126, preferably at any time during the aiming and firing process. A reticle 113 is also included to assist in the aiming process.

The main body 110 is preferably a single continuous unitary body that protects the optics therein. In the illustrated embodiment, the main body 110 surrounds and houses the optical train 126 to reduce introduction of contaminants into the scope 100. The one-piece main body 110 comprises the enlarged objective end 114, the enlarged eyepiece end 118, and a narrow medial or central tubular body 130 therebetween. In one embodiment, the main body 110 can extend uninterrupted from the widened objective end 114 through the narrow central tubular portion 130 to the widened eyepiece end 118. Preferably, both the objective end 114 and eyepiece end 118 house one or more lenses of the optical train 126, e.g., the objective and the ocular, respectively. In the once piece configuration, the unitary main body 110 preferably houses both the objective and eyepiece. The central tubular portion 130 of the main body 110 can house at least a portion of the optical train 126, such as erecting optics, that can ensure that the image viewed with the scope 100 is properly oriented. The one-piece design preferably reduces exposure of the optics to moisture, particulates, and other foreign matter that may degrade performance of the scope 100. The one-piece main body 110 is also likely to be more rugged and durable, offering resistance to the large forces and impacts created by firing a gun. In addition, the one-piece main body 110 weighs less than its multi-piece counterpart, thereby producing less recoil force. In other embodiments, either of the eyepiece end 118 or the objective end 114, or both, may be removably connect to the central tubular body 130, for example, by threading so as to be screwed in place and separated by unscrewing.

Figure 2A:
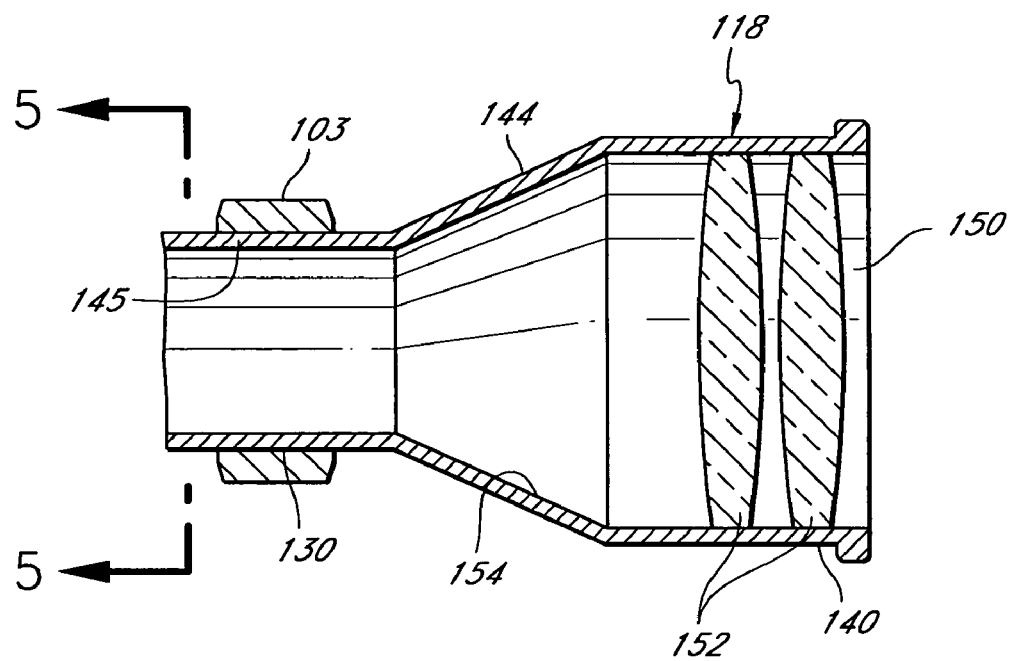
FIG. 2A is an enlarged side cross-sectional view of an eyepiece end of the scope of FIG. 1.

FIG. 2A is a close-up view of the eyepiece end 118 of the main body 110 preferably housing an ocular lens 152 in a proximal end 140 of the eyepiece. As illustrated in FIG. 2A, the proximal end 140 of the eyepiece portion 118 preferably includes an opening or aperture 150 for viewing through the scope 100. In the embodiment depicted, the proximal end 140 is a tubular body that preferably holds the ocular 152, which comprises a pair of lens elements. Other types of ocular lenses 152 that may include more or less lens elements or other optical elements may also be employed. It is also contemplated that the eyepiece end 118 can have any shape or configuration suitable for holding the ocular 152 and provide a viewing window for looking through the scope 100.

Optionally, positioning structures can be disposed on an inner surface 154 of the eyepiece end 114 for securing the ocular 152 in place. The positioning structures can prevent relative movement between the ocular 152 and the eyepiece housing 118. Other methods of securing the ocular 152 within the eyepiece end 118 of the scope are also possible. Still in other embodiments, one or more lens elements in the ocular is moveable and may be used to focus the image in some cases.

In the illustrated embodiment, the eyepiece end 118 may further comprise a tapered portion 144. The tapered portion 144 extends from the proximal end 140 and tapers in the distal direction. For example, the tapered portion 144 can have a generally circular cross-sectional profile that is reduced in the distal direction towards the objective end 114. The tapered portion 144 of the eyepiece end 118 is preferably coupled to the central tubular portion 130 of the main body 110 as shown in FIGS. 2 and 2A. In other embodiments, the eyepiece end 118 and/or the central tubular portion 130 may be shaped and/or contoured differently and may have different relative sizes than shown.

The narrow central tubular portion 130 has a proximal end 145 connected to the eyepiece end 118. Preferably, the central tubular portion 130 of the main body 110 is permanently connected to the eyepiece end 118. For example, the central tubular portion 130 may be fused to the eyepiece end 118 or the central tubular portion and the eyepiece end may be molded or otherwise integrated together. The eyepiece end 118 and the central tubular portion 130 may also be fabricated from the same piece of material.

As shown in FIG. 2, the tubular body 130 is also coupled to the objective end 118. The objective end 114 of the scope main body 110 preferably houses an objective 180 as illustrated in the close-up view shown in FIG. 2B.

Figure 2B:
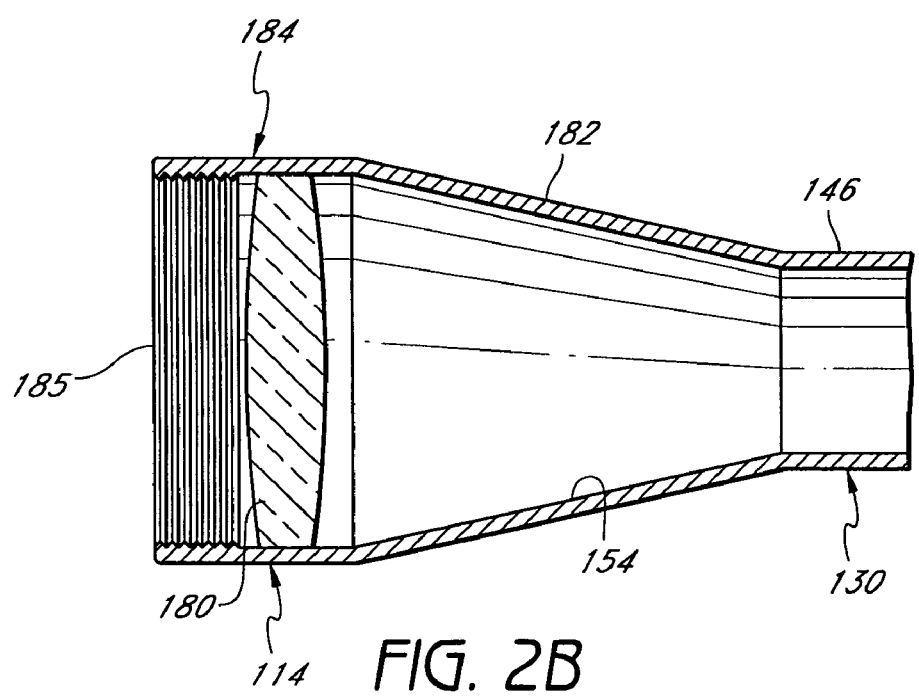
FIG. 2B is an enlarged side cross-sectional view of the objective end of the scope of FIG. 1.

As also shown in FIG. 2B, the objective portion 114 of the main body 110 has a distal end 184 that includes an opening 185 for viewing an object through the scope 100. In the illustrated embodiment, the distal end 184 is a tubular body configured to engage and hold the objective 180 of the optical train 126. However, it is contemplated that the objective end 118 can have any shape, size, or configuration suitable for holding the objective 180 and providing a viewing window for viewing a distant target through the scope 100. For example, the distal end 184 can have a generally constant (non-tapered) cross-sectional profile along its length. However, other configurations are possible.

Optionally, mounting structures can be disposed on the inner surface 154 of the objective end 118 for securely holding the objective 180. The mounting structures can grip and prevent movement of the objective 180 relative to the objective end 118. Other methods of securing the objective 180 within the objective end 114 of the scope 100 are also possible. In other embodiments, however, the objective 180 may include one or more movable optical elements.

In the embodiment illustrated in FIG. 2B, the objective end 114 may further comprise a tapered portion 182. The tapered portion 182 preferably extends from the distal end 184 and tapers in the proximal direction. For example, the tapered portion 182 can have a generally circular cross-sectional profile that is reduced towards the ocular end 118. In other embodiments, the objective end 114 and/or the central tubular portion 130 may be shaped and/or contoured differently and may have different relative sizes than shown.

The tapered portion 182 of the objective end 114 is preferably permanently coupled to the distal end 184 and to the narrow tubular body 130 of the main body as shown in FIG. 2B. The narrow central tubular portion 130 has a distal end 146 and this distal end is preferably connected to the objective end 114 such that the objective end 114 and the narrow central tubular portion are integrated together in a continuous, uninterrupted fashion. Accordingly, the objective end 114 and the central narrow tubular body 130 are connected together to form a continuous uninterrupted housing for the objective optics 180. For example, the central tubular portion 130 may be fused to the objective end 114 or the central tubular portion and the objective end may be molded, or otherwise integrated together. The objective end 114 and the central tubular portion 130 may also be fabricated from the same piece of material.

Accordingly, in various preferred embodiments, the central tubular portion 130 of the main body 110 is permanently connected to at least one of the eyepiece end 114 and the objective end 118. Optionally, the central tubular body portion 130 is permanently connected to both the eyepiece end 114 and the objective end 118. In some embodiments, however, the central tubular portion 130 of the main body may be temporarily coupled to either or both the objective end 118 and the eyepiece end 114.

Figure 3:
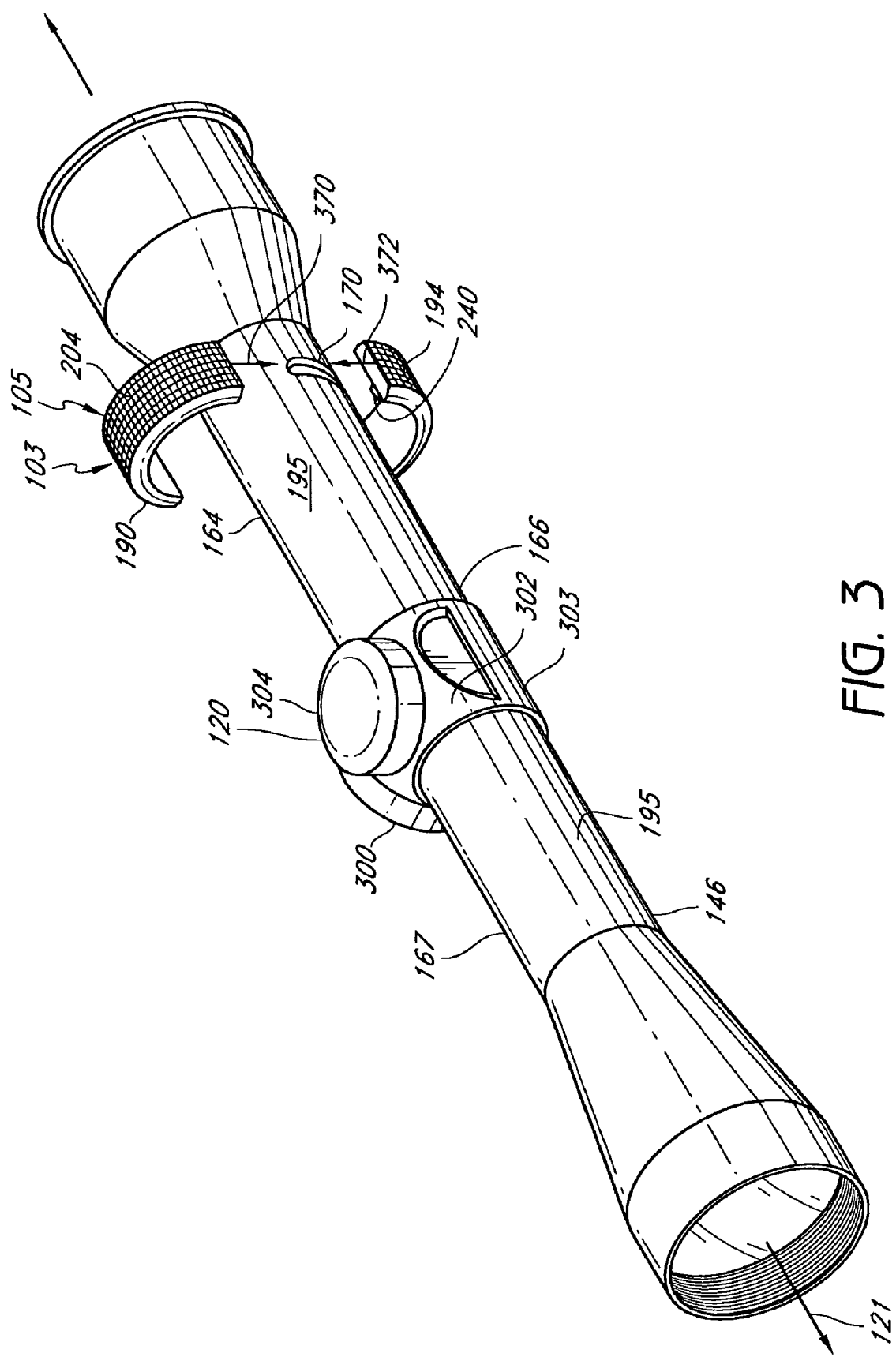
FIG. 3 is a perspective view of the scope of FIG. 1, with an exploded view of a portion of the zoom assembly comprising a zoom selector ring in an opened position.
Figure 4:
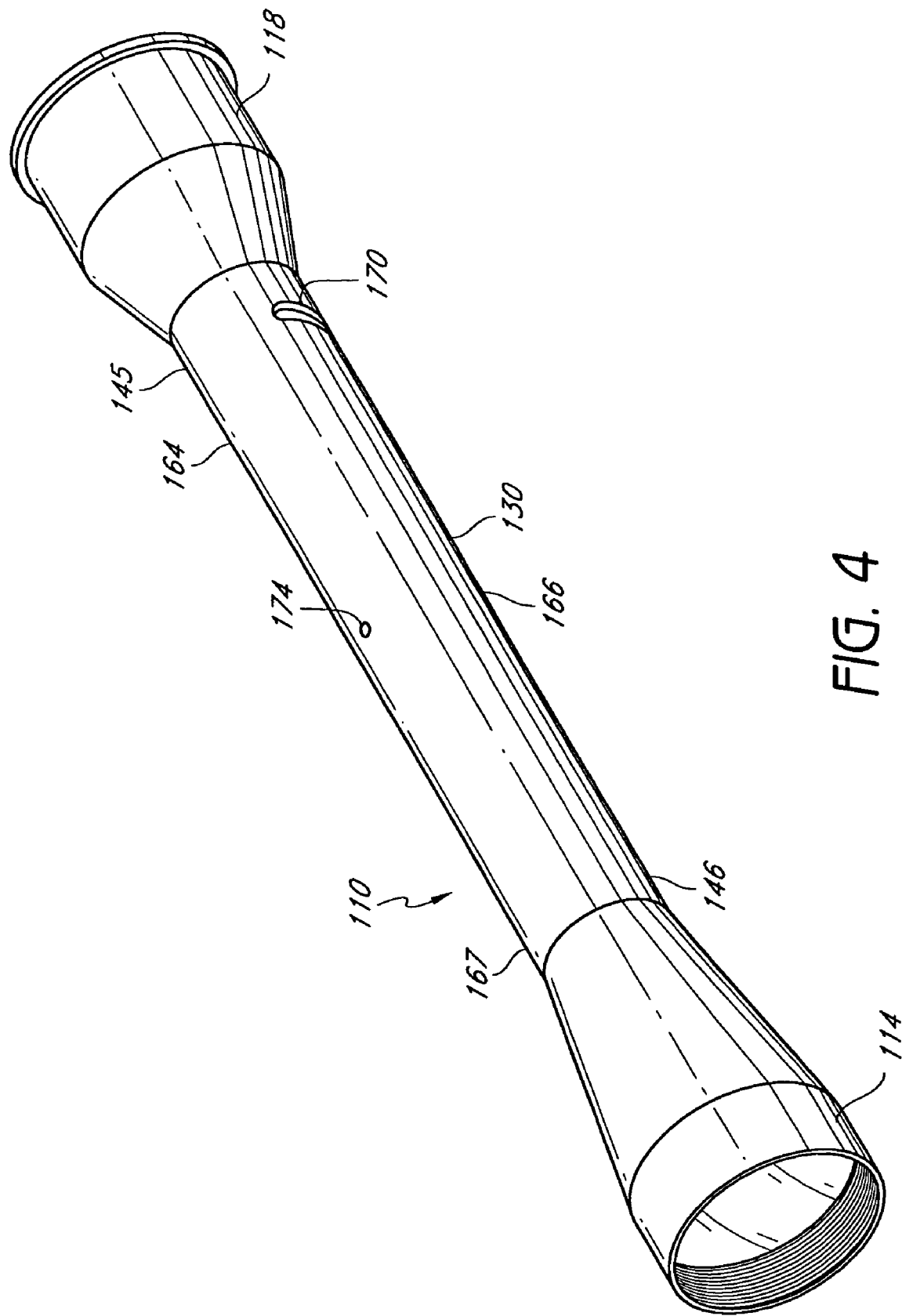
FIG. 4 illustrates a main body of the scope shown in FIG. 1 with the zoom selector ring removed.

As shown in FIGS. 3 and 4, the tubular body 130 extends continuously from a proximal portion 164, through a middle body portion 166, and to a distal portion 167. As illustrated, the tubular body 130 of the scope 100 has a generally tubular shape that is sized and configured to house erecting optics. In various embodiments, a substantial portion of the central tubular body portion 130 has a cross-sectional area that is less than the cross-sectional area of the eyepiece end 114 although such a configuration is not required. In some embodiments, a substantial portion of the tubular body 130 has a cross-sectional area that is less than the cross-sectional area of the objective end 118. In the illustrated embodiment, the entire tubular body 130 has a cross-sectional area that is less than the cross-sectional area of the eyepiece end 114 and the cross-sectional area of the objective end 118. In other embodiments, however, the size, shape, and contouring of the main body 110 may be different. In other embodiments, however, the tubular body 130 may be the same size or larger than one of the objective end 114 or eyepiece end 118 or both. The tubular body 130 can also have a cross-sectional area that varies along its length. For example, the tubular body 130 may have a widened portion to support the zoom selector ring 105 sized to be comfortably handled by the user. However, the tubular body 130 can have any shape suitable for housing one or more components of the optical train 126 and possibly for supporting the positioning system 120 and/or the zoom selector ring 105.

As shown in FIG. 3, the proximal portion 164 of the tubular body 130 is disposed through and surrounded at least in part by the zoom selector ring 105. Additionally, the proximal portion 164 of the tubular body 130 can have an elongated opening or slot 170 (see, e.g., FIG. 4).

The slot 170 in the tubular body 130 defines a window between the interior and the exterior of the main body 110 so that an extension from the zoom selector ring 105 can pass through and into the interior of the main body 110 and engage a support structure supporting optics in the optics train 126 as discussed more fully below. In the illustrated embodiment, the slot 170 has a generally constant width and continues along a portion of the circumference of the main body 110. The slot can have other shapes and sizes in other embodiments and need not be restricted to the slot shown. The slot 170 can also be positioned elsewhere. For example, the slot 170 can alternatively be disposed in the middle body 166 or the distal portion 167. Likewise the zoom selector ring 105 can be located elsewhere, including on the eyepiece end 118.

As shown in FIG. 4, an opening or hole 174 can optionally pass through the main body 110, e.g., in the middle portion 166 of the tubular body 130 to receive an actuator that forms part of the positioning system 120. Preferably, for example, movement of the windage and elevation dials 304, 300 may be coupled through the hole 174 to adjust optics in the optics train 126 to effectuate the appropriate corrections for proper aiming. Preferably, however, the slot 170 and the opening 174 do not permit moisture or contaminants from reaching the optics in the scope 100.

As described above, the main body 110 is preferably formed out of a unitary piece of material. In one embodiment, a tube, preferably made of metal, is processed into an elongated substantially cylindrical body having a widened proximal and a widened distal end. As illustrated in FIG. 4, both ends of the cylindrical body can be forged into a partially cone shaped eyepiece end 114 and objective end 118. The frustaconical shaped taper of the objective end 114 and the eyepiece end 118 of the main body 110 can be forged by placing the ends of the main body 110 into a mold. The main body 110 can then be heat treated to gradually enlarge the end portions of the main body 110. Multiple molds can be used to incrementally increase the size of the eyepiece end 114 and the objective end 118 until the desired shape is obtained. After the main body 110 is molded and shaped as desired, the entire main body 110 can be annealed to reduce residual stresses of the main body 110. In another embodiment, the main body 110 is formed by machining a piece of material into the desired shape. For example, a metal body can be machined with a cutting tool to produce the cylindrical main body 110. In another embodiment, the main body 110 can be formed by a die casting process. For example, molten metal can disposed into a cavity of a die casting machine. The die casting machine may comprise two bodies that mate and form the cavity in the shape of the main body 110. The molten material can then be, for example, injected into the cavity in some embodiments. In addition to die casting, the main body may be swagged (deformed by punching) from an extrusion to achieve a blank that could then be machined. Different embodiments may be machined from an extrusion, swagged, or die cast. Other process may also be employed.

Optionally, the main body 110 can be formed through a one-step or multi-step process. For example, the eyepiece end 114 and the objective end 118 can be formed in a central tubular body. The slot 170 can then be formed in a portion of the body. It is contemplated that any portion of the main body 110 can be formed at any suitable time. For example, the slot 170 can be formed before the eyepiece end 114 is shaped. Additionally, the different portions of the main body 110 of the scope 100 may be formed separately and fused or bonded together, for example, by welding or other processing techniques. Preferably, however, the main tube end product comprises a single unitary piece of material. As described above, however, in various preferred embodiments, the main tube does not require bonding but comprises a single unitary piece that is processed to form the end product having the objective and eyepiece portions 114, 118 together with the central tubular portion 130. Those skilled in the art will readily appreciate various processes can be employed to produce the main body 110.

The main body 110 preferably comprises a material that is suitable for housing optics and preferably has suitable corrosion resistant characteristics. For example, the main body 110 may comprise metal, plastic, composites, and/or the like. In various embodiments, the main body 110 comprises magnesium. In certain exemplary embodiments, the main body 110 comprises aluminum-magnesium-titanium alloy. The materials, however, should not be limited to those specifically recited herein as a variety of materials can be used alone or in combination to form the main body 110. The appropriate dimensions and the type of materials that form the main body 110 may be determined based on, e.g., the arrangement of the optical train 126 and the desired weight and structural properties of the main body 110.

As described above, the zoom selector ring 105 may be used as a control for controlling the optical train 126. In particular, the user can rotate the zoom selector ring 105 in certain preferred embodiments to adjust the size of the images viewed through the scope 100.

The zoom selector ring 105 may be multi-piece body configured to slidably engage the main body 110. In one embodiment, the zoom selector ring 105 is a segmented body that extends substantially around the unitary, uninterrupted main body 110. FIG. 3 shows an embodiment of the zoom selector ring 105 comprising a plurality of segments that mate with the outer surface 195 of the main body 110. The zoom selector ring 105 is depicted in an opened position in FIG. 3 with the segments spaced apart. Such a configuration may be advantageous in assembly of the scope 100. In various embodiments, for example, the inner diameter of the zoom selector ring 105 is smaller than both the outer diameter of the objective end 114 and the outer diameter of the eyepiece end 118. In such cases, separated segments of the zoom selector ring 105 may be combined to form the selector ring around the narrow central body portion 130. In other embodiments, however, the inner diameter of the zoom selector ring 105 is preferably smaller than the outer diameter of one of the objective end 114 and the eyepiece end 118. Accordingly, in other embodiments, the zoom selector ring 105 may have a single body configuration.

In the embodiment illustrated in FIG. 3, the selector ring 105 is located between the center of the main body 110 and the proximal end 145. In another embodiment, the selector ring 105 is spaced less than about ⅓ of the length of the tubular body 130 from the eyepiece end 114. Although the zoom selector ring 105 is preferably located along the proximal portion 164 of the tubular body, optionally, the selector ring 105 can be located along the middle body 166 or the distal portion 167 of the central body 130 or on the eyepiece end 116. In certain embodiments, the main body 110 can have an annular ridge or body that mates with an inner annular body or groove of the selector ring 105 to prevent longitudinal movement between the selector ring 105 and the main body 110.

In the illustrated embodiment of FIG. 3, the zoom selector ring 105 comprises a pair of curved segments 190 and 194 that can be closed, e.g., by joining the separate segments together. When the selector ring 105 is in the closed position, each of the segments 190, 194 is preferably arranged about the circumference of the tubular body 130. In one embodiment, the zoom selection ring 105 extends at least substantially about the circumference of the main body 110. FIG. 1 depicts the segments disposed circumferentially about the outer surface 195 of the tubular body 130.

Figure 5:
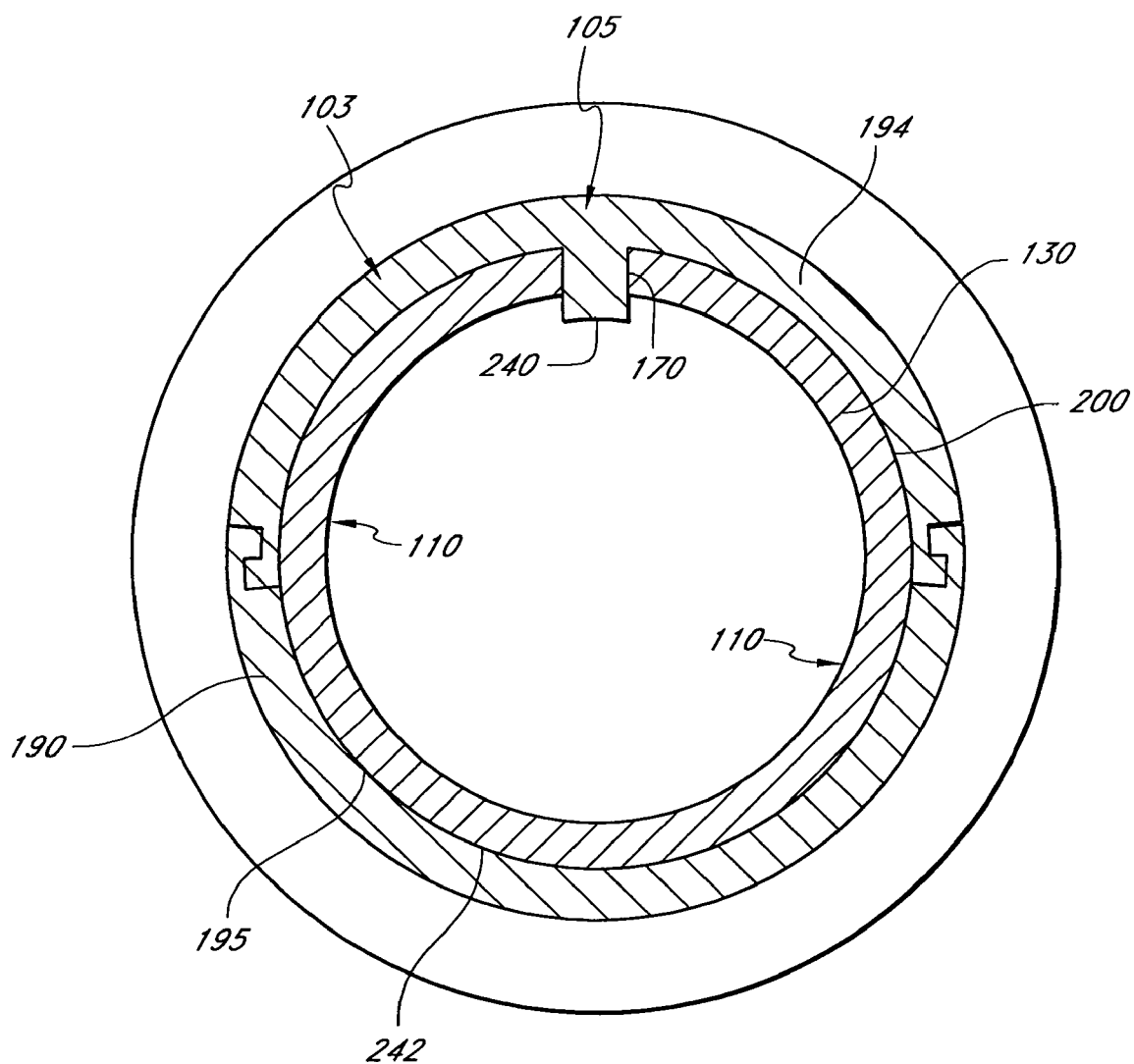
FIG. 5 is a cross-sectional view of the scope along line 5-5 in FIG. 2A.
Figure 6:
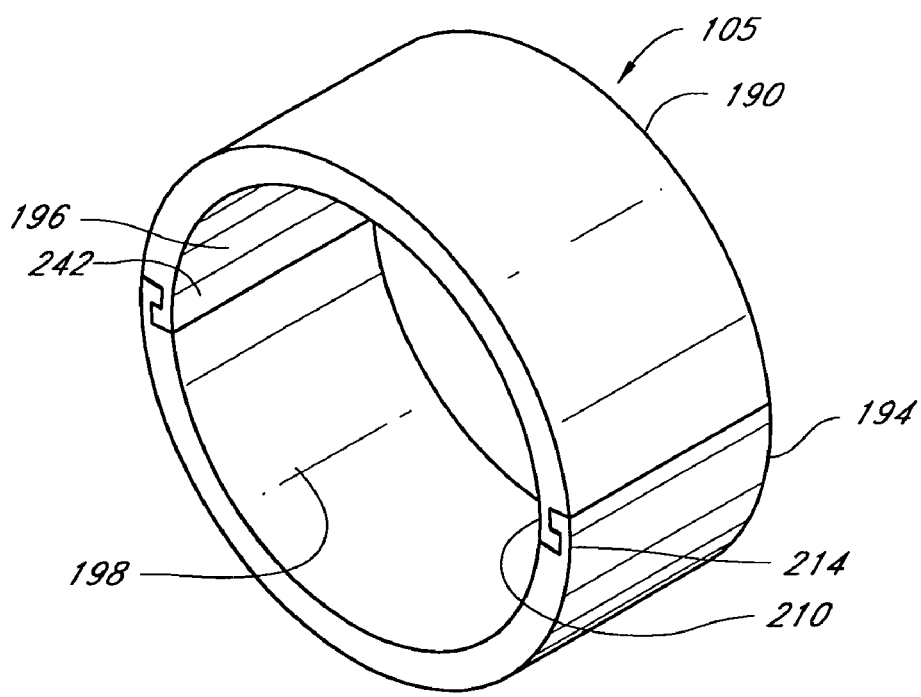
FIG. 6 is a perspective view of one embodiment of a zoom selector ring in a closed position.

As illustrated in FIGS. 5 and 6, the curved segments 190, 194 can have inner surfaces 196, 198 that preferably form a surface 242 which mates with the outer surface 195 of the main body 110. The surface 242 can have a generally tubular shape and can be concentric with the outer surface 195 of the main body 110 when the zoom selector ring 105 is in the closed position.

As shown in the cross-sectional view depicted in FIG. 5, each of the segments 190, 194 extends about a portion of the main body 110. The segments 190, 194 can be similarly or differently sized of the main body 110. For example, the segments 190, 194 can each extend about 180° around the tubular body 130 of the main body 110. Preferably, the segments 190, 194 are disposed about the main body 110 such that the two segments completely circumscribe the main body 110. In one embodiment, the zoom selector ring 105 can preferably comprise more than two segments. For example, the zoom selector ring 105 can comprise three segments that are fastened together. The three segments can each extend about 120° around the tubular body 130 and can be fastened or coupled together to form a zoom selector ring 105. The segments can be fastened together in a similar manner as the segments 190, 194, as discussed below. It is contemplated that any suitable number of segments can be used to form the zoom selector ring 105. The segments 190, 194 may be securely coupled together to limit, preferably prevent, relative movement between the segments 190, 194, thereby forming a generally annular zoom selector ring that preferably maintains it shape during operation.

Figure 7A:
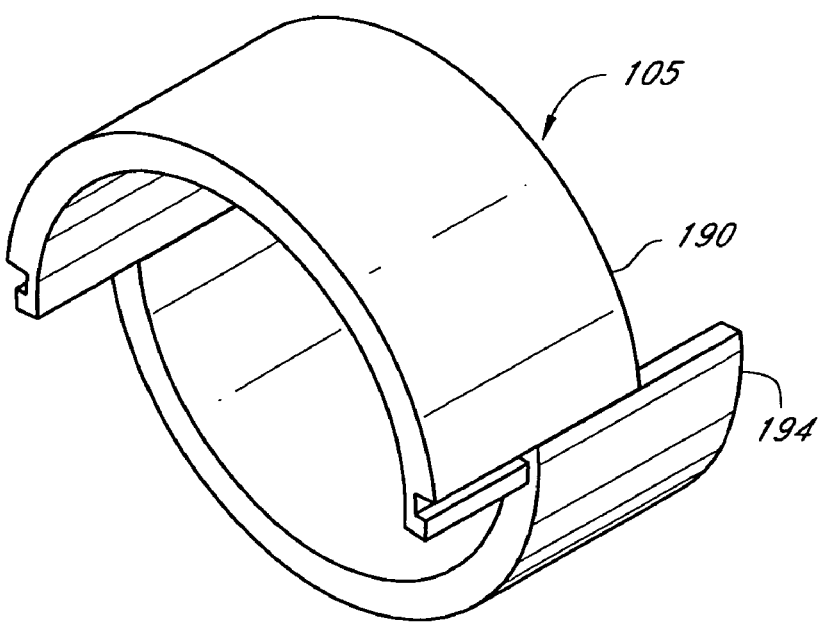
FIG. 7A is a perspective view of the zoom selector ring of FIG. 6 schematically illustrating interconnection of sections of the zoom selector ring.
Figure 7B:
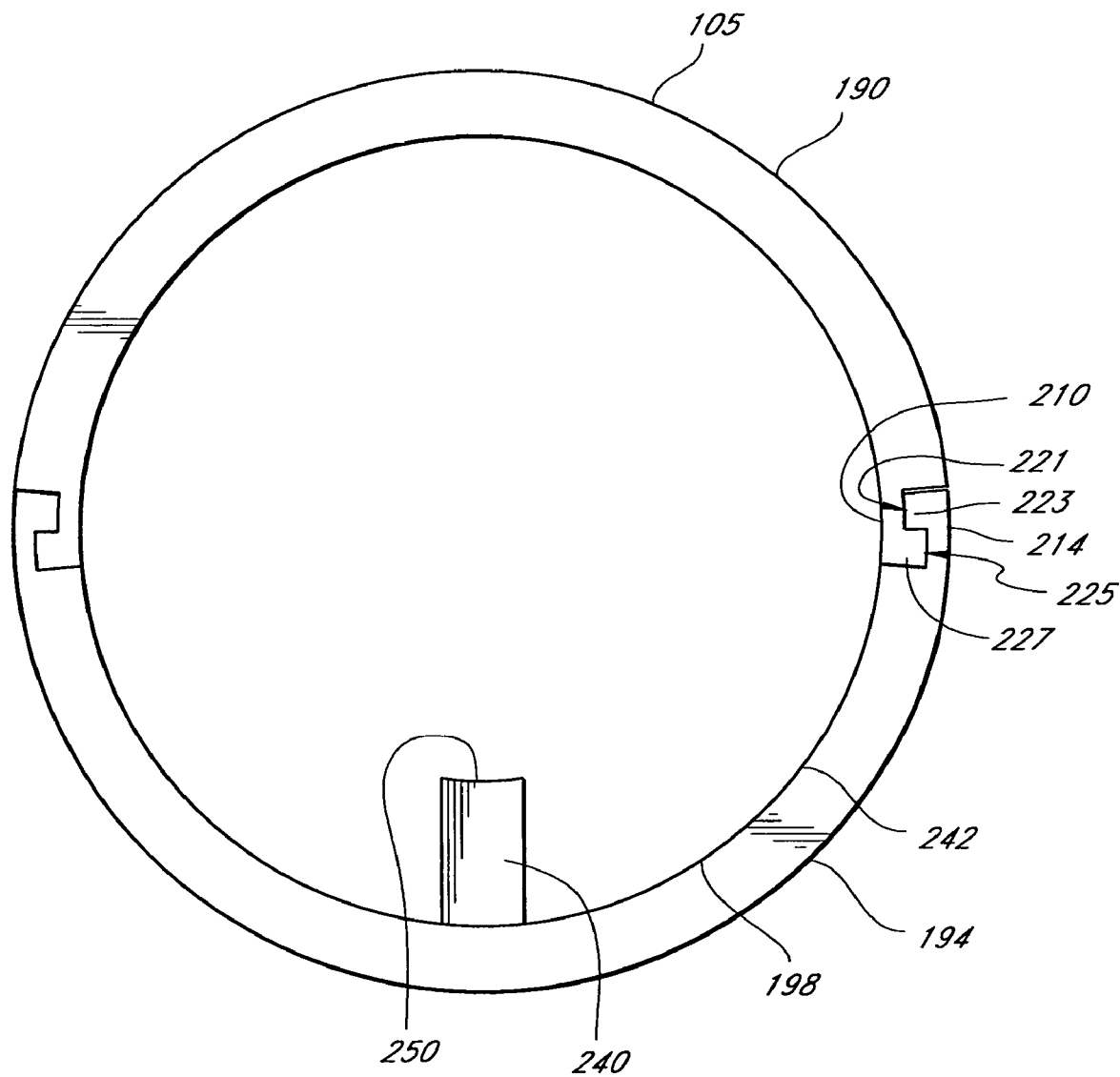
FIG. 7B is front view of the zoom selector ring of FIG. 7A.

FIGS. 6, 7A, and 7B show the selector ring 105 comprising coupling structures 210, 214 for coupling together the curved segments 190, 194. The segments 190, 194 can be slid together linking the segments together. As shown in FIG. 7B, the segments may be outfitted with a ridges 223 and 227 that interlock. As illustrated, for example, the coupling structure 210 has a slot 221 configured to receive a portion of the segment 194. In one embodiment, the slot 221 faces outwardly and is configured to receive at least a portion of the ridge 223 of the coupling structure 214. The coupling structure 214 has a slot 225 configured to receive a portion of the segment 190. In the illustrated embodiment, the slot 225 faces inwardly and is configured to receive at least a portion of the ridge 227 of the coupling structure 210. Preferably, the slots 221, 225 are toleranced to reduce or prevent substantial movement of the segments 190, 194 away from each other. Optionally, the slots 221, 255 can have ratchets, teeth, and/or other structures to prevent relative longitudinal movement between the segments 190, 194. For example, although not illustrated, a pin can be disposed through the segments 190, 194 to prevent relative longitudinal movement between the segments 190, 194. In one embodiment, a pin is disposed through the coupling structures 210, 214 and locks the segments 190, 194 together. The segments 190, 194 can be interlocked or connected in other ways as well.

As shown in FIG. 7B, the zoom selector ring 105 can have a structure configured to control the optical train 126. In the illustrated embodiment, the selector ring 105 has a protuberance or member 240 that can pass through the slot 170 and couple the zoom selector ring to the optical train 126, e.g., via a structure supporting the optics. The protuberance 240 can extend inwardly from the inner surface 242 of the zoom selector ring 105. The protuberance 240, however, can be located at any suitable point along the selector ring 18. The protuberance 240 is preferably sized and configured to pass through the slot 170 such that the protuberance 240 can be slid along the slot 170 as the zoom selector ring 105 is rotated about the longitudinal axis 121 of the scope 100. The protuberance 240 and the slot 170 can therefore cooperate to define the amount of travel of the zoom selector ring 105. The protuberance 240 extends from the surface 198 of the segment 194 and passes through the slot 170 (see FIG. 5) in the central narrow portion 130 of the main body 110 and continues through the wall of the tubular body 130. In some embodiments, the protuberance 240 may be configured to engage a structure supporting a portion of the optical train 126 to drive movable portions of the optical train in the longitudinal direction, as described below.

A seal 200 (see FIG. 5) may optionally be formed between the zoom selector ring 105 and the tubular body 130. In one embodiment, at least a portion of inner surfaces 196, 198 of the segments 190, 194, respectively, can interact with the outer surface 195 of the tubular body 130 to form the seal 200. The integrity of the seal 200 is preferably maintained as the zoom selector ring 105 slidably engages the tubular body 130 so that foreign matter is prevented from entering the scope 100 by, e.g., passing through the slot 170. Thus, the zoom selector ring 105 can be rotated about the main body 110 while the optics remains contaminate free. In one embodiment, a substantial portion of the surface 242 of the zoom selector ring 105 engages the outer surface 195 of the scope 100 to form the seal 200. Optionally, a slip ring or other body can be disposed between the tubular body 130 and the selector ring 105 to reduce friction.

The zoom selector ring 105 can have a generally annular configuration. However, the zoom selector ring 105 can have a polygonal (including rounded polygonal), elliptical, circular, combinations thereof, or any other suitable cross-section. The size and shape of the zoom selector ring can be selected based on design ergonomics, or other design considerations. Additionally, the zoom selector ring may be made of metal, plastic, rubber, polymers, or any other suitable material.

In the illustrated embodiment, the zoom selector ring 105 has a generally uniform cross-sectional profile along its longitudinal axis. However, the zoom selector ring 105 can have a cross-sectional profile that varies along its longitudinal axis. The zoom selector ring 105, for example, may be ergonomically designed and have a dimple that comfortably fits the fingers of the user. The zoom selector ring 105 can be shaped and contoured in other ways, for example, for interaction with the use or connection with the main body 110 of the scope 100, of for other reasons including aesthetic design.

Additionally, the zoom selector ring 105 can optionally have an outer surface 204 (FIG. 3) configured to be engaged by a user to easily rotate the ring 105 about the longitudinal axis 121 of the scope 100. The zoom selector ring 105 can comprise an outer surface 204 adapted to provide friction between the user's fingers and the zoom selector ring 105. For example, the outer surface 204 may comprises knurling substantially about the entire outer surface 140 of the zoom selector ring 105. Serrations, roughened surfaces, and other finishing may be provided. The outer surface 204 can have any suitable texture or structures for providing a gripping surface. Alternatively, the zoom selector ring 105 can have other designs yielding the desired interaction between the user and the ring 105. Optionally, for example, the outer surface 140 can be generally smooth. In some embodiments the zoom selector ring 105 includes an elastic band that extends about the zoom selector ring 105. This elastic band may assist in tactile control by the user.

The zoom selector ring 105 may comprise a variety of materials. Examples include but are not limited to metal and plastic.

Rotational movement of the zoom selector ring 105 causes movement of the one or more lenses in the optical train 126 to provide the desired zoom. In particular, rotation of the zoom selector ring 105 may cause the optics in the optics train 126 to be longitudinally displaced with respect to each other. A mechanism for shifting the optical elements in the optics train 126 is discussed more fully below. Additionally, the positioning system 120 can be employed to laterally displace one or more optical elements in the optics train 126 and adjust the windage and/or elevation. Such approach is also discussed below.

Figure 8:
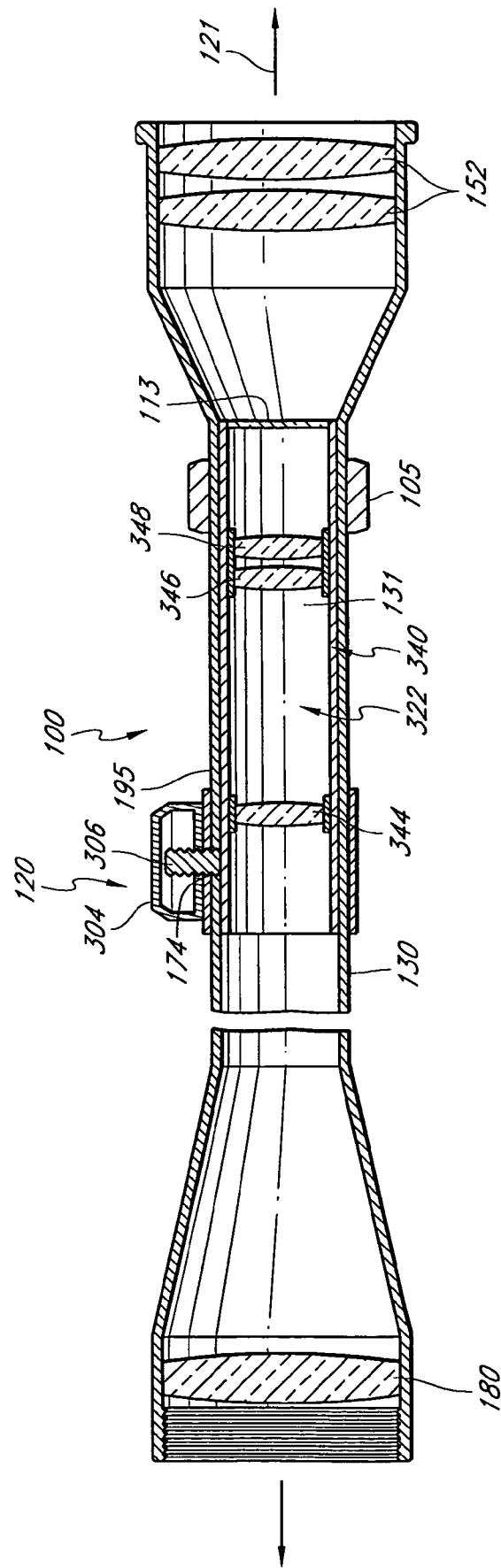
FIG. 8 is a side cross-sectional view of the scope of FIG. 1 showing the erector assembly disposed between the objective end of the scope and the eyepiece end.

As shown in FIG. 8, the tubular body 130 preferably defines a hollow channel 131 that is configured to receive a portion of the optical train 126. As described above, the optical train 126 preferably comprises a plurality of lenses including, e.g., the objective lens 180 and the ocular 152, that are arranged to provide an image of the target. In the various embodiments, the optical train 126 further comprises an erector assembly 322 disposed between the ocular 152 and the objective 180. The erector assembly 322 may include a plurality of lenses that inverts the image to ensure that the viewer observes erect, properly oriented, images through the scope 100. The erector assembly 322 comprises an erector housing 340 that contains a plurality of erector lens elements 344, 346, 348 that are spaced along the erector housing.

As illustrated in FIG. 8, the positioning system 120 can be used to tilt and shift a portion of the optical train 126 such as the erector assembly 322. The positioning system 120 comprises the windage dial 300 (not shown) and screw (not shown) and the elevational dial 304 and screw 306. The screw for the windage dial 300 and the screw 306 for the elevational dial 304 can pass through the outer surface 195 of the tubular body 130 through the opening 174. The screw 306 can be advanced in and out of the tubular body 130 by rotating the elevational dial 304. For example, the elevational dial 304 can be rotated to cause vertical movement of the screw 306 which, in turn, causes vertical movement of the distal end of a erector assembly 322 or the zoom mechanism. The windage dial 300 can be rotated in a similar manner to laterally displace the distal end of the erector assembly 322. Thus, the windage dial 300 and the elevational dial 304 can be used to shift and/or tilt the erector assembly 322 to the desired position and orientation.

Additionally, the optics in the erector assembly 322 may be altered by manually operating the zoom selector ring 105 thereby causing the image to appear closer or farther. Preferably, at least a portion of the erector assembly 322 is axially movable relative to another portion of the optical train 126 to provide telescopic zoom capability of the scope 100. For example, the erector assembly housing 340 can be configured to engage at least a portion of the zoom selector ring 105 so that manual or automatic rotation of the zoom sector ring about a longitudinal axis 121 through the scope 100 causes movement or one of more erector lens elements 344, 346, 348 in the longitudinal direction.

Figure 9:
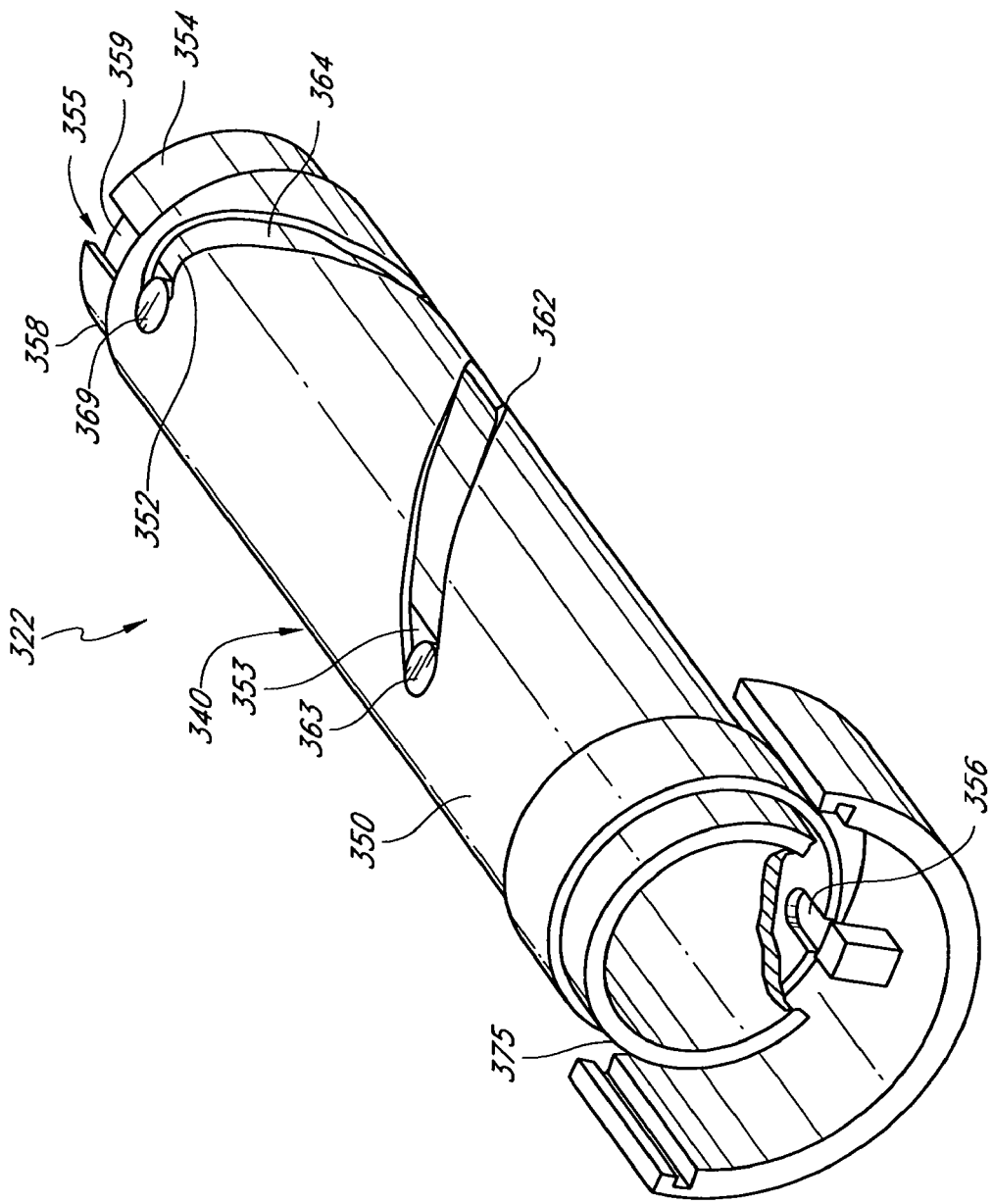
FIG. 9 is a perspective view of an erector assembly and a portion of a zoom selector ring linked to the erector assembly, wherein the erector assembly comprises a housing comprising an outer tube, an inner tube, and carriages in the inner tube.
Figure 10:
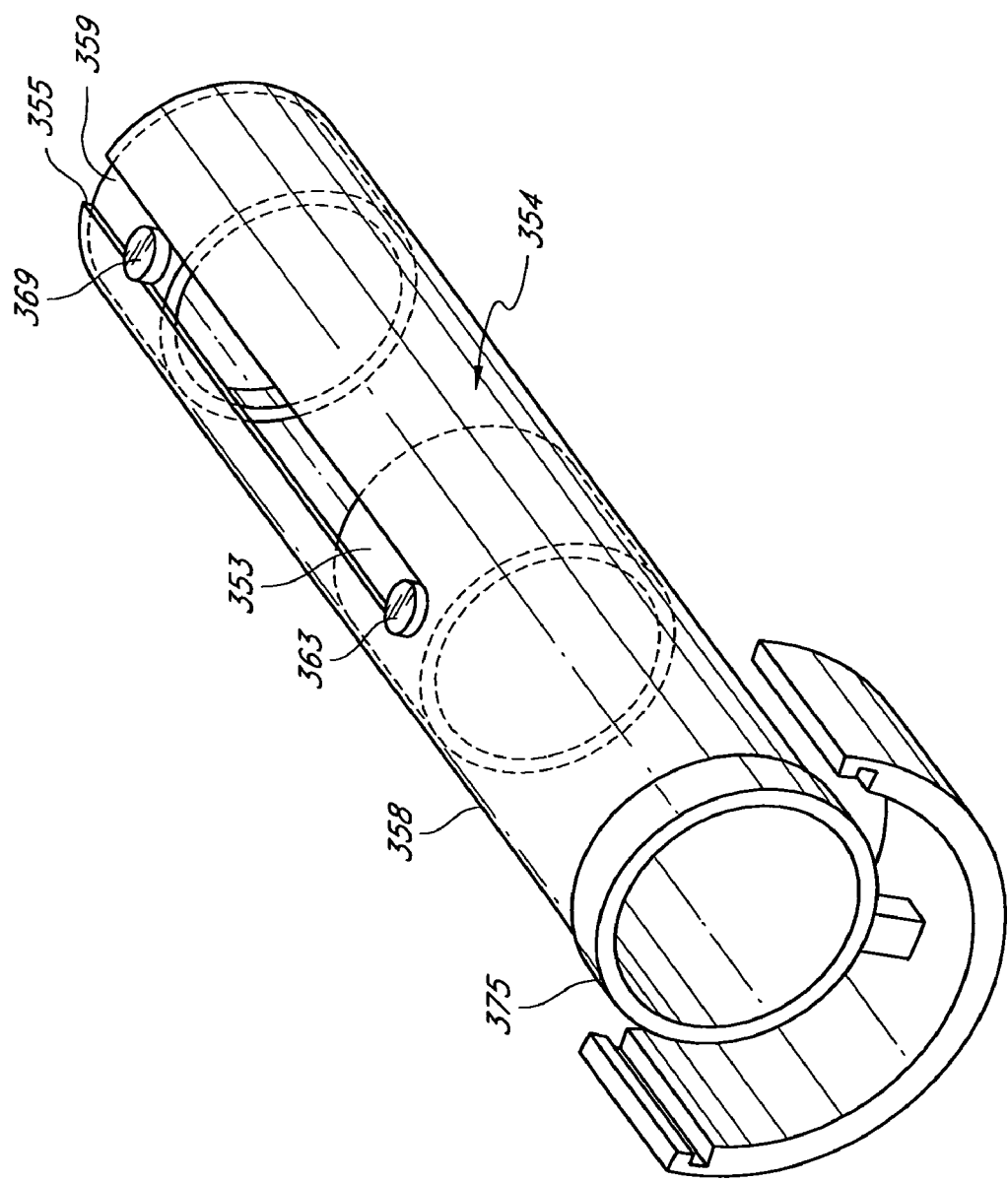
FIG. 10 is a perspective view of the carriages inside the inner tube of a housing of the erector assembly.
Figure 11:
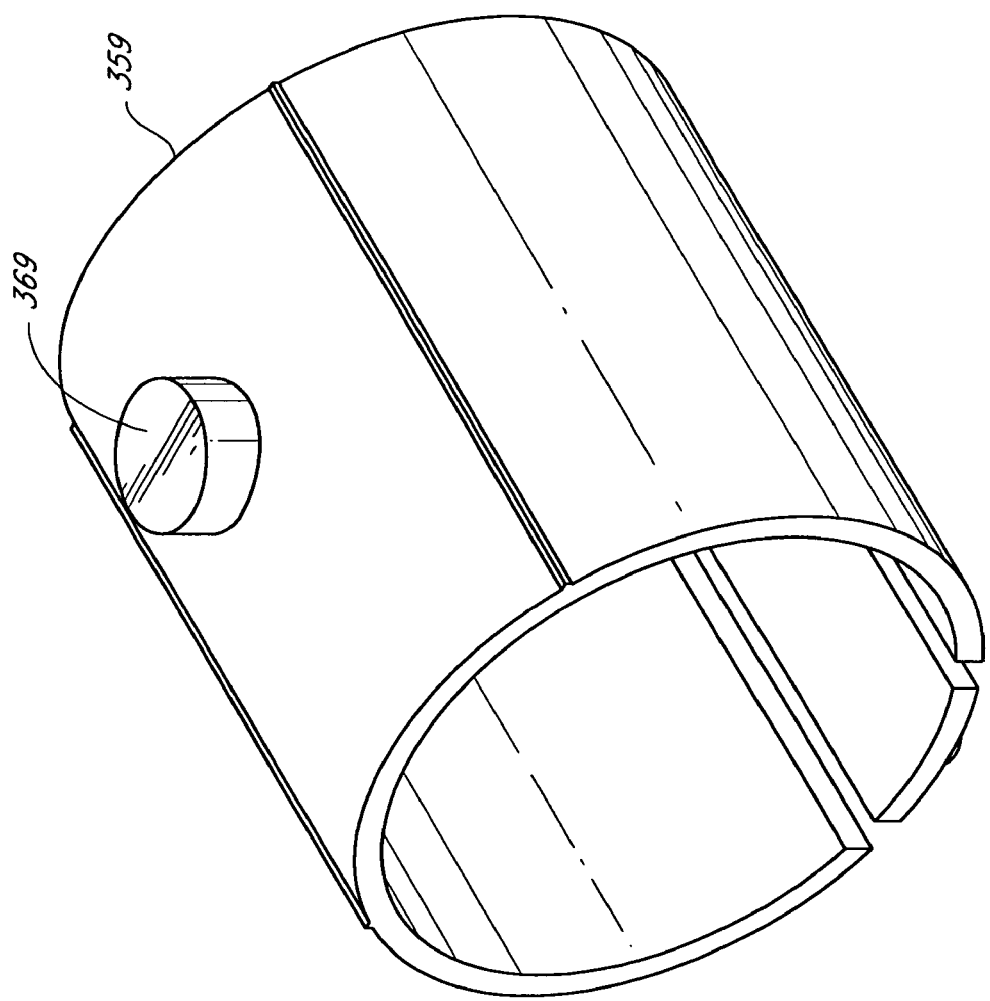
FIG. 11 is a perspective view of a carriage of the erector assembly of FIGS. 9 and 10.

FIG. 9 shows the housing 340 of the erector assembly 322 comprising an outer tubular body 350 having a cam 352 and an inner tube 354 having a slot 355. The inner tube 354 fits within the outer tubular body 350. As shown in FIGS. 9 and 10, the erector assembly 322 can include moveable carriages 353, 359 that can fit inside the inner tube 354 but engage the outer tubular body 350. These carriages 353, 359, one of which is schematically illustrated in FIG. 11, hold optics of the optical train 126. For example, the proximal carriage 353 supports and carries the rearward lens elements 346, 348 and the distal carriage 359 supports and carries the forward lens element 344. The carriages 353, 359 can be moved with respect to the inner tube 354, outer tube 350, and main tube 110 by rotating the selector ring 105; see FIG. 9.

Figure 12:
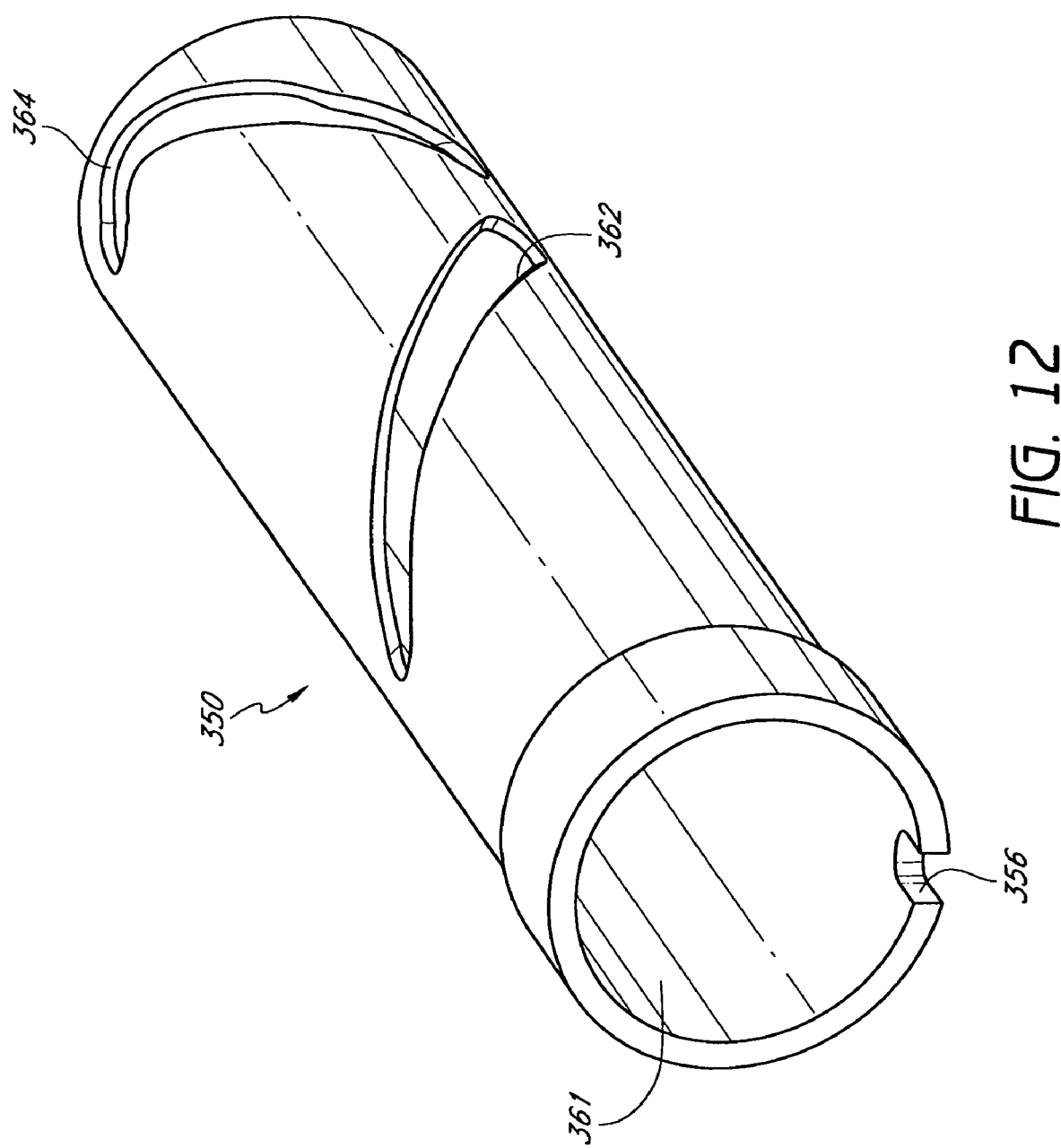
FIG. 12 is a perspective view of the outer tube of the housing of the erector assembly of FIG. 8.

As shown in FIGS. 9 and 12, a cam 352 and a notch 356 can be defined in the outer tube 350. The cam 352 may be a spiral-like opening defined by the outer tube 350 and is configured to receive and slidably engage the protrusions of the carriage (see FIG. 9). Other shapes are also possible. Optionally, a plurality of cams 352 may used. In the illustrated embodiment, the outer tube 350 includes first and second cams 362, 364. Each of the cams 362, 364 can be configured to slidably engage a protrusions 363, 369 on the rearward and forward carriages 353, 359, respectively. It is contemplated that the length and curvature of the cams 362, 364 can be varied to achieve the desired amount of longitudinal travel of the carriages 353, 359 for a certain amount of rotation of the zoom selector ring 105. For example, the scope 100 can provide 3× magnification when the carriages 353, 359 travel the entire length of their respectively cams 362, 364. In another embodiment, the scope can provide 5× magnifications when the carriages 353, 359 travel the entire length of their respective cams 362, 364. Moreover, cams 362, 364 may cause the first carriage 353 to move with respect to the second carriage 359 (or vice versus) and with respect to the objective and eyepiece. Alternatively, the first and second carriage 353, 359 can move a same amount with respect to the objective and eyepiece. Other configurations are possible. For example more or less number of carriages may be used and only some of the lens elements 344, 346, 348 may be moved in certain embodiments.

With continued reference to FIG. 9 and FIG. 12, the notch 356 is preferably configured to receive a portion of the member 240 of the selection ring 105. In one embodiment, the notch 356 is a U-shaped notch sized to receive the member 240 shown in FIGS. 5 and 7B. As the selector ring 105 is rotated, the member 240 is disposed within the notch 356 to cause rotation of outer tube 350 about the longitudinal axis 121 of the scope 100. As the outer tubular body 350 rotates about the longitudinal axis 121 relative to the inner tube 354, the carriages 353, 359 can move relative to each other, to the objective or to the eyepiece or any combination thereof as the protrusions 363, 369 on the respective carriages proceed along cams 362, 364.

As shown in FIG. 12 the outer tube 350 has an inner surface 361. Similarly, the inner tube 354 has an outer surface 358 as shown in FIG. 10. Preferably, the inner surface 361 of the outer tubular body 350 moves with respect to the outer surface 358 of the inner tube 354 as the outer tube 350 is rotated and the carriage 353, 359 are displaced. In various preferred embodiments, the inner tube 354 is fixed, for example, to the main tube 110 to prevent rotation of the inner tube when the zoom selector ring 105 and outer tube 350 are rotated. Preferably, the outer surface 358 of the inner tube 354 is in substantial contact with the inner surface 361 of the outer tube 350 so as to provide sealing therebetween. Such a seal may counter formation of contaminant between the inner tube 354 and the outer tube 350 and on the optics therein.

In various preferred embodiments, the inner tube 354 provides a guide for the carriages 353, 359 as the outer tube 350 is rotated. FIGS. 9 and 10 illustrate the connection between the inner tube 354 and the carriages 353, 359. In the illustrated embodiment, the inner tube 354 has an elongated slot 355 configured to receive protrusions 363, 369 of the carriages 353, 359. The slot 355 extends proximally from the distal end of the inner tube 354. As described above, the inner tube 354 can be coupled to the main body 110 (e.g., through lip 375) to prevent or inhibit relative rotation between of the inner tube 354 and the main body 110. Connection between the inner tube 354 and the main body 110 therefore preferably ensures that the inner tube 354 does not rotate relative to the main body 110 such that the carriages 353, 359 can be guided in a longitudinal direction with the rotation applied by the outer tube 350. Accordingly, the erector optics will be axially translated to provide zoom capability.

In operation, the scope 100 can be mounted to a firearm. The firearm can have a mounting structure for receiving and holding the scope 100. A user can hold and position the firearm so that the scope 100 is located in a desired position. The optical train 126 of the scope 100 may include a reticle (e.g., cross-hair reticle 113 shown in FIG. 2) that indicate the expected impact location of a projectile (e.g., a bullet, arrow, pellet, BB, paintball, or the like) fired from the firearm.

The user can operate the positioning system 120 to accommodate for windage and/or elevation. For example, if there is a cross wind, the windage may cause the projectile fired from to firearm to miss the desired target that is viewed through the scope 100. To ensure that the projectile impacts the desired target, the user can rotate the windage dial 300 which, in turn, rotates its corresponding screw that laterally shifts the optical train 126 to accommodate for the windage. In the illustrated embodiment, the windage dial 300 is used to position the distal end of the erector assembly 322. Once the erector assembly 322 is located in the proper position, the user can position the cross-hair reticle 113 of the scope 100 on the target and ignore the windage, which is already taken into account. To accommodate for elevation, the user can rotate the elevational dial 304, which causes rotation and vertical movement of the screw 306 (shown in FIGS. 2 and 8). The screw 306 can be moved until the erector assembly 322 is tilted to the proper location. Once the erector assembly 322 is in the desired position, the user can position the cross hairs of the scope 100 on the target and disregard the elevation.

The user can operate the zoom selector ring 105 to obtain the desired zoom. In the illustrated embodiment, the user can rotate the zoom selector ring 105 to position one or more of the optical elements (e.g., one or more of the erector lenses 344, 346, 348) of the optical train 126 to adjust the amount of magnification of the scope 100. To move the zoom selector ring 105, the user can grip and twist the zoom selector ring 105 about the longitudinal axis 121 of the scope 100. To provide discrete amounts of longitudinal magnification, the zoom selector ring 105 may have a plurality of predetermined locations that correspond to a certain zoom/magnification settings. The zoom selector ring 105 may be biased to several angular positions. However, in some embodiments the zoom selector ring 105 may provide a continuous range of levels of zoom. It is contemplated that the zoom selector ring 105 can be operated before, during, and/or after operation of the positioning system 120.

In one embodiment, when the zoom selector ring 105 is rotated in the counter-clockwise direction about the longitudinal axis 121 from the perspective of the user, the outer tube 350 likewise rotates in the counter-clockwise direction and the carriages 353, 359 moves towards each other. When the zoom selector ring 105 is moved in the clockwise direction about the longitudinal axis 121 from the perspective of the user, the outer tube 350 likewise rotates in the clockwise direction and moves the carriages 353, 359 away from each other. The user can therefore rotate the zoom selector ring 105 to move the erector assembly 322 to obtain a desired amount of magnification. Other designs are possible.

As described above, in various preferred embodiments, the scope can be assembled by forming the continuous, uninterrupted unitary tubular main body 110. In the illustrated embodiment, the unitary main body 110 includes the objective end 114 and the eyepiece end 118 that have a cross-sectional area that is greater than the cross-sectional area of a substantial portion of the narrow tubular body 130 of main body 110.

The zoom selector ring 105 can be separated or split apart into a plurality of components, and the components can be assembled together to form the zoom selector ring 105. In one embodiment, the zoom selector ring 105 can be positioned in the open position, as shown in FIG. 3, such that the segments 190, 194 can be located about the main body 110. The segments 190, 194 can be moved together in a direction of the arrows 370, 372. If the selector ring 105 has a protrusion 240, the protrusion 240 is preferably inserted into the slot 170 in the outer tube 350 in order to have the protrusion 240 fit within the notch 356 of the erector assembly 322.

Once the selector ring 105 is in the closed position such that the segments 190, 194 are located about the main body 110 (FIG. 1), the segments 190, 194 are coupled together. In the embodiment of FIGS. 6-7B, the segments 190, 194 can slidably engage each other. As shown in FIG. 7A, the segments 194, 190 can then be moved relative to each other until the segments reach the position shown in FIG. 6.

As depicted in FIG. 9 and discussed above, the zoom selection ring 105 is preferably connected to the erector assembly 322 so as to engage the optical train 126. In the illustrated embodiment, the zoom selector ring 105 is oriented so that the protuberance 240 mates with the notch 256. Likewise, movement of the protuberance 240 and the outer tube 350 causes rotation of the outer tube 350 of the erector assembly 322 and displacement of components of the optical train 126 along the main body 110. In various embodiments, the carriages 353, 359 move the lenses of the erector in response to rotational movement of the zoom selector ring 105.

Figure 13:
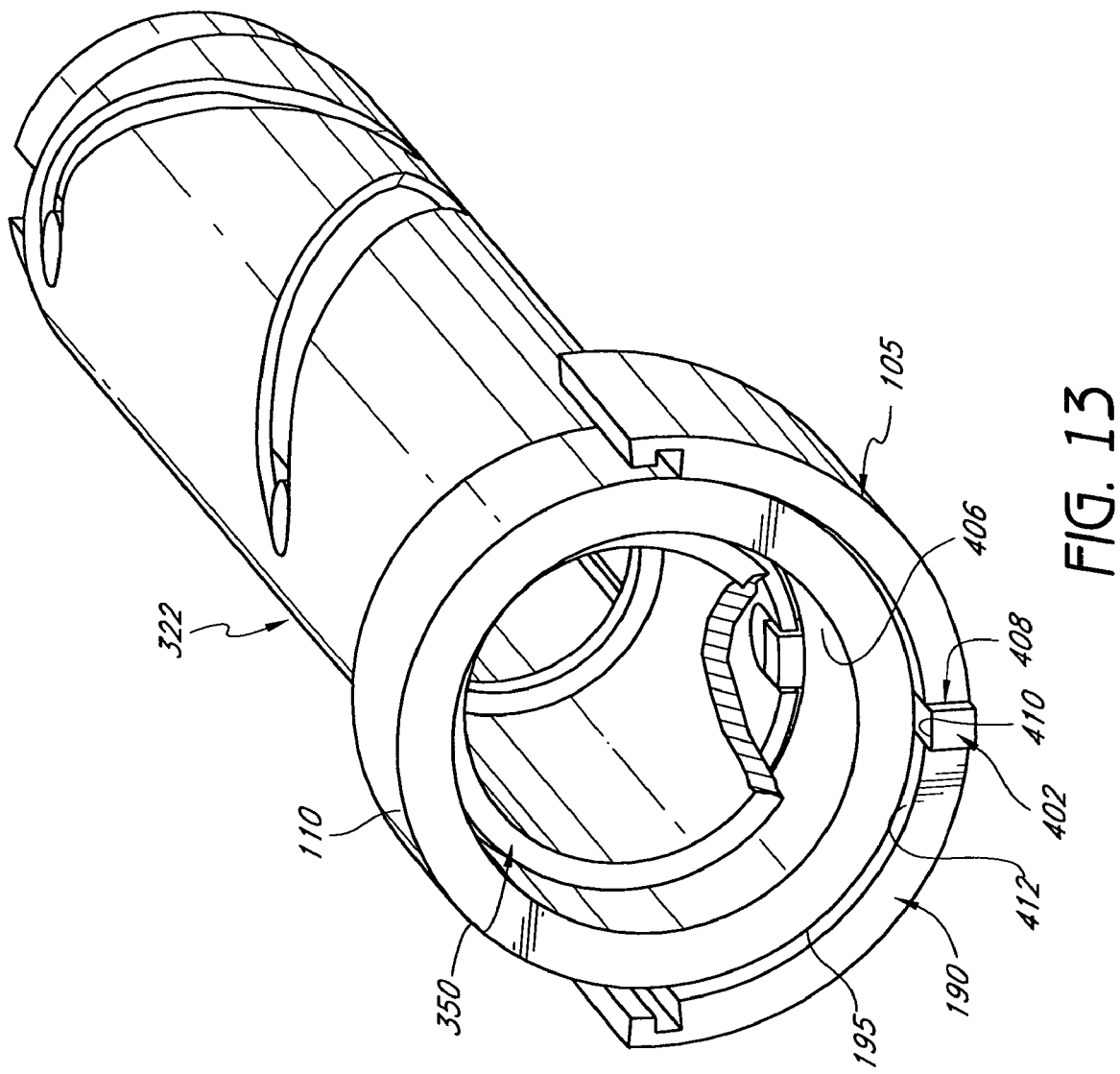
FIG. 13 is a perspective view of a portion of a scope having an erector assembly with a zoom selector ring, wherein the erector assembly and zoom selector ring have magnetic elements to interact with each other.

FIG. 13 illustrates one embodiment of a zoom selector ring 105 for a zoom assembly wherein the scope 100 has a single continuous main tubular body 110 without a slot 170 (see FIG. 4 for comparison). The zoom selector ring 105 is disposed on the uninterrupted tubular body 130 and is used to adjust the optics in the tubular body. The zoom selector ring 105 can be used to move one or more lenses of the scope 100 even though the wall of the main body 110 is interposed between the ring 105 and the optical train 126 and the ring 105 does not directly contact the erector assembly 322. The continuous, unitary cylindrical main body 110 therefore can substantially completely prevent any foreign matter from entering into the interior of the scope 100.

In one embodiment, the scope 100 includes exterior and interior magnetic elements for magnetically coupling the zoom selector ring 105 to the optics of the optical train 126. In the embodiment illustrated in FIG. 13, the zoom selection ring 105 preferably comprises an exterior magnet 402 outside the main body 110 that interacts with a corresponding interior magnet 406 inside the main body. Preferably the interior magnet 406 is magnetically coupled to the exterior magnet 402 such that movement of the exterior magnet induces corresponding movement of the interior magnet. In various preferred embodiments, the interior magnet 406 is attached to the erector assembly 322 such that movement of the interior magnet 406 will cause movement of the erector assembly.

The outer tube 350 can have a cut-out that holds the interior magnet 406. In certain embodiments, one of the segments 190, 194 of the selector ring 105 also has a recess 408 configured, e.g., shaped and sized, to hold the exterior magnet 402. The exterior magnet 402 can have an inner surface 410 that can cooperate with the segment 190 to form a surface 412 to engage the outer surface 195 of the main body 110.

The pair of magnets 402, 406 can couple the movement of the outer tube 350 and the selector ring 105 because the magnets 402, 406 generate a magnetic field that causes the magnets 402, 406 to be attracted towards each other. Thus, when the selector ring 105 is rotated, the outer tube 350 and selector ring 105 rotate substantially in unison. When the outer tube 350 rotates, the optics of the optical train 126 moves in the manner described above. The number, position, and type of the magnets associated with the zoom selector ring 105 and the erector assembly 322 may vary. For example, each of the selector ring 105 and the erector assembly 322 can have diametrically opposed magnets. The diametrically spaced pairs of magnets are preferably arranged to ensure that the selector ring 105 and the inner tube 354 move together. Optionally, the spacing between the magnets 402, 406 can vary to achieve the desired interaction between the magnets. For example, the thickness of the main body 110 between the selector ring 105 and the erector assembly 322 can be reduced to increase the force between the magnets 402, 406. In other embodiments, for example, where zoom is effectuated by translation of optics other than the erector optics, different configurations may be used.

Regardless of the type of connection between the zoom selector ring 105 and the optics train 126, the main body 110 preferably curtails the amount of foreign matter such as moisture, dust, dirt, and other contaminants that reaches the optics. Dirt and contamination on the optics may reduce the resolution and clarity of the images. Foreign matter may also cause malfunction of the moving parts in the scope. Contamination may hasten deterioration and may also interfere with the precise alignment of the aiming device.

Figure 14:
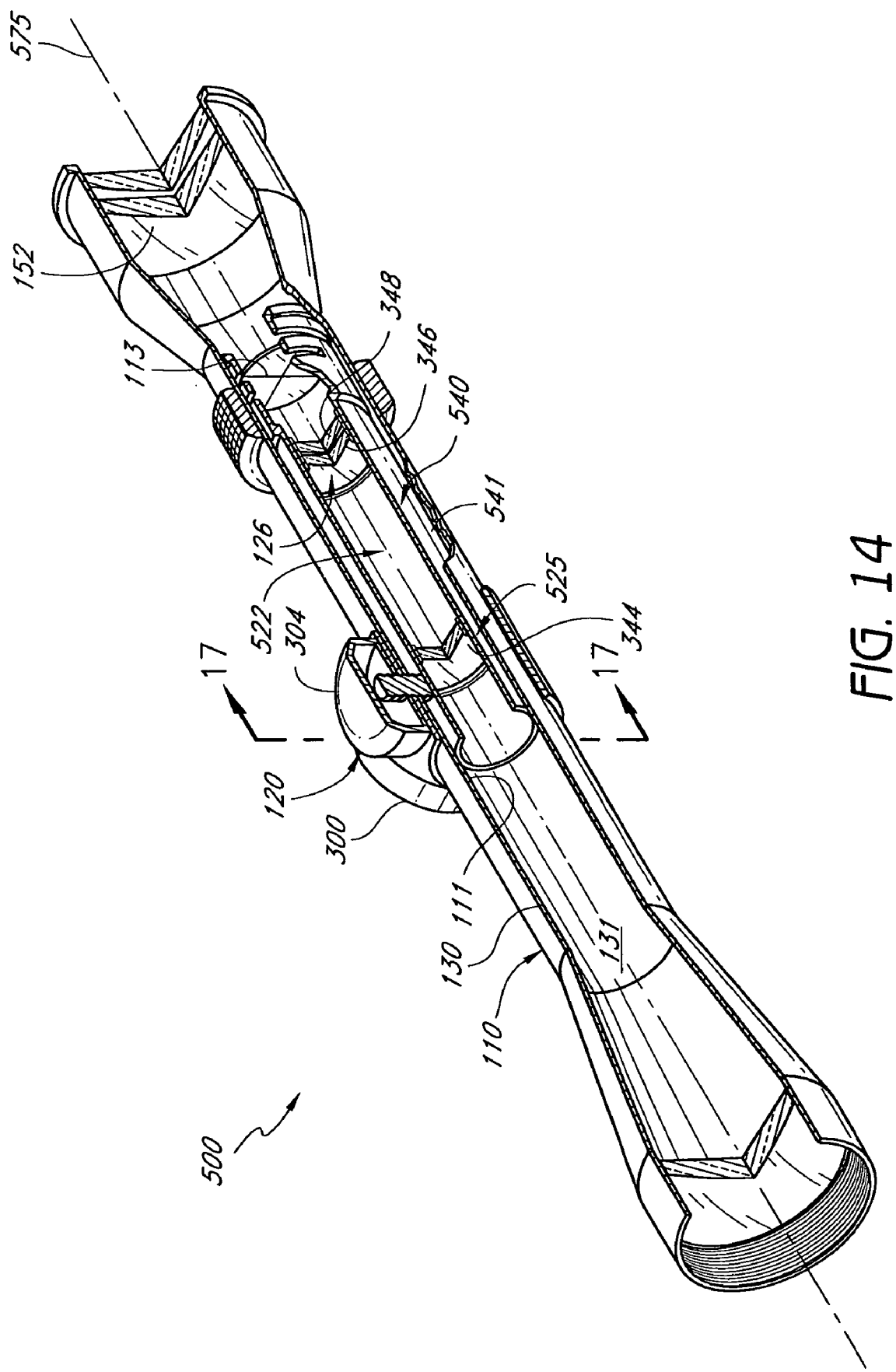
FIG. 14 is a perspective cutaway view of a scope schematically illustrating a flexible erector assembly in the scope.

Another advantageous feature that may be incorporated in the scope design is illustrated in FIG. 14, which shows a scope 500 that has a flexible erector assembly 522 that cooperates with the positioning system 120 to laterally align the optical train 126. This flexible erector assembly 522 flexes in response to adjustments to the windage and elevation actuators 300, 304.

As shown in FIG. 14, the flexible erector assembly 522 comprises an erector housing 525 that contains the optical train 126 that inverts images to ensure that the viewer observes erect, properly oriented images through the scope 500. In the embodiment depicted in FIG. 14, this erector housing 525 comprises a flexible erector tube 540. In various preferred embodiments, the erector tube 540 houses one or more optical lens, such as the lens elements 344, 346, 348.

Although not illustrated, the scope 500 may include other components such as for example a zoom assembly similar to the zoom assembly 103 described above. The erector tube 540 may for example have slots or cams (see the outer tube 350 illustrated in FIG. 9) that convert rotation movement of a zoom selection ring into longitudinal translation of optics in the optical train 126. The one or more cams may be configured to receive and engage one or more carriages similar to the carriages 353, 359 described above. An inner tube like the inner tube 354 discussed above in connection with FIG. 9 may be included to guide the movement of the carriage or carriages. Alternatively, the scope 500 can have other types of zoom arrangements or may have no zoom capability.

As illustrated in FIG. 14, the flexible erector tube 540 is disposed in the hollow interior region or channel 131 within the main body 110 of the scope 500. The flexible erector tube 540 extends from the positioning system 120 to a location proximal to the ocular lens 152. The central tubular body 130 of the main body 110 has interior sidewall surfaces 111 defining the hollow interior region 131. Similarly, the erector tube 540 has exterior sidewall surfaces 541. The exterior sidewall surfaces 541 of the erector tube 540 move with respect to the interior sidewall surfaces 111 of the main body 110, for example, as the flexible erector tube 540 is laterally displaced as discussed more fully below.

Figure 16:
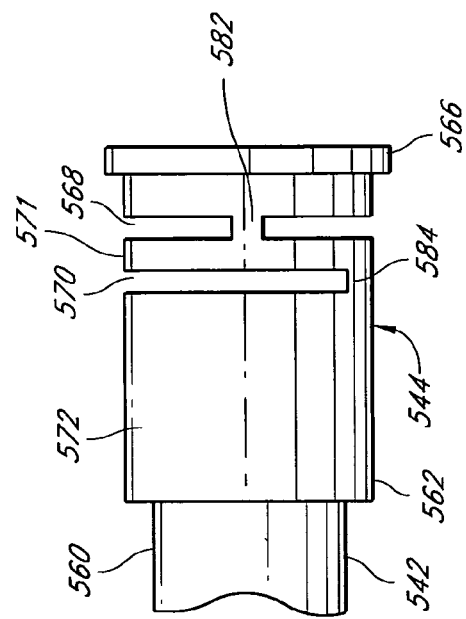
FIG. 16 is a side view of the flexible portion of the erector tube schematically illustrating a plurality of cutouts for providing flexure and a mounting flange tube for affixing the erector tube to the main body of the scope.
Figure 15:
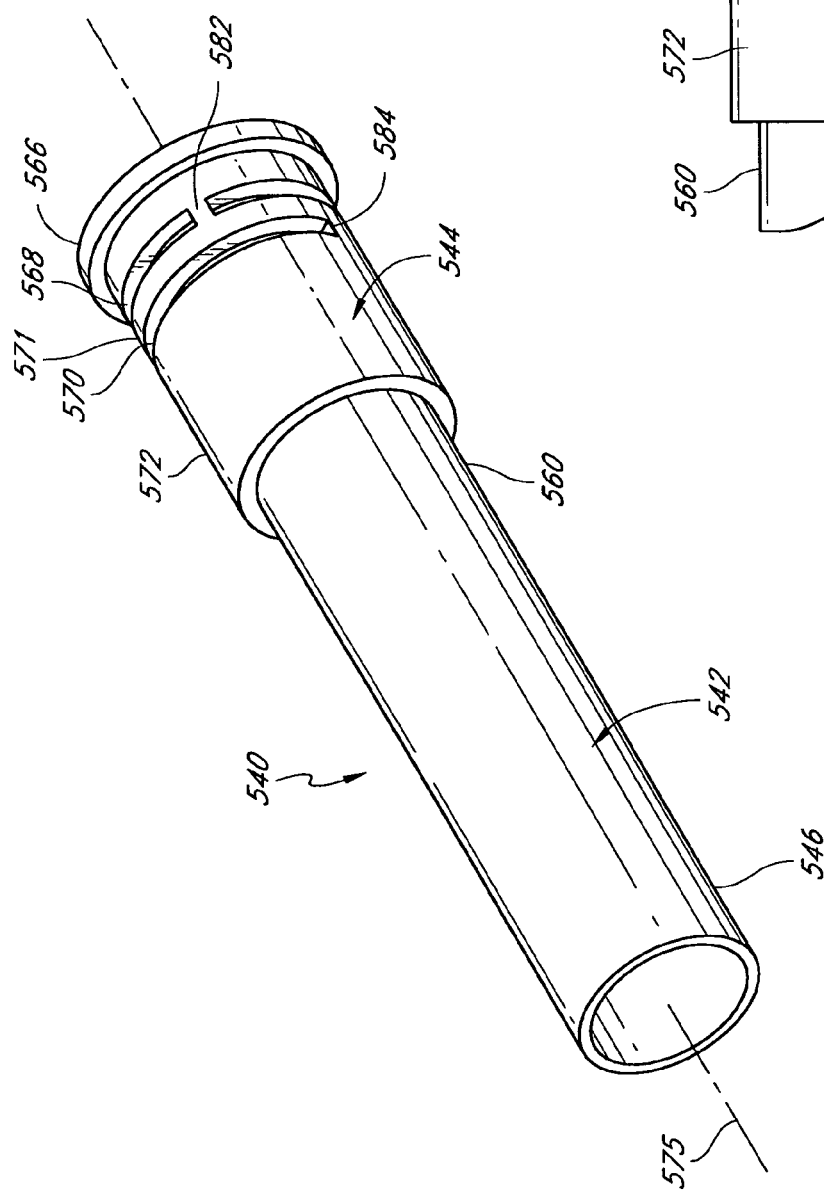
FIG. 15 is a perspective view of an erector tube comprising an elongate and a flexible portion.

As illustrated in FIG. 15, the flexible erector tube 540 comprises an elongate portion 542 connected to a flexible portion 544. In the embodiment shown, the elongate portion 542 comprises a generally rigid cylindrical tube configured to fit within the main body 110 of the scope 500 and that is engaged by the positioning system 120. A distal end 546 of the elongate portion 542 is positioned along the main body 110 such that the screws of the positioning system 120 can contact the distal end 546. As illustrated in FIGS. 15 and 16, the elongate portion 542 has a proximal end 560 that is coupled to the flexible portion 544 of the tube. Other designs are possible. For example, the elongate portion 542 may be shaped differently and may be at least partially flexible in some embodiments. One of ordinary skill in the art may also determine the appropriate combination of material type, thickness, and length of the elongate portion 542 to achieve the desired structural properties resulting in controlled alignment of the optical train 126 during operation of the scope 500.

The flexible portion 544 provides localized flexure such that the erector tube 540 operates like a cantilevered spring. In various preferred embodiments, the flexible portion 544 has sidewalls that are generally less rigid than the elongate portion 542, thereby permitting more flexure of the flex portion 544 than the elongate portion 542. In the illustrated embodiment, the flex portion 544 includes a mounting flange 566 as well as first and second cut-outs 568, 570. The mounting flange 566 is at the proximal end of the flexible portion 544. A cylindrical body 572 of the flexible portion 544 extends distally from the mounting flange 566 and defines the spaced apart cut-outs 568, 570. The cut-outs 568, 570 reduce the rigidity of the flex portion 544 to permit flexure induced by adjustment of the elevational dial 304 and/or the windage dial 300.

The pair of cut-outs 568, 570 may permit flexure of the flexible portion 544 in one or more directions. In the embodiment shown in FIGS. 15 and 16, the first cut-out 568 defines a connecting first portion 582 while the second cut-out 570 defines a second connecting portion 584. An annular member 571 is interposed between the cut-outs 568, 570 and is connected to the connecting portions 582, 584. The first and second connecting portions 582, 584 are adapted to flex when the user adjusts the positioning system 120 thereby applying one or more forces to the erector tube 540. The cut-outs 568, 570 and connecting portions 582, 584 can cooperate to permit movement of the flexible portion 544 in generally orthogonal directions. The positioning system 120, however, can shift the erector tube 540 in any desired direction. The first and second connecting portions 582, 584 can be angularly spaced from each other about a central longitudinal axis 573 through the erector tube 540. The number of connecting portions 582, 584 need not be limited to two. The material and thickness of the flexible portion 544 as well as the length and the width of the connecting portions 582, 584 can be selected to achieve the desired structural properties of the flexible portion 544. For example, the width of the connecting portion 582 can be increased or decreased in size to increase or decrease, respectively, the rigidity of the flexible portion 544. Other designs are also possible.

The flexible portion 544 is secured to the main body 110 with the mounting flange 566. In the embodiment shown in FIG. 14, for example, the mounting flange 566 is secured to the main body 110 while at least part of the elongate portion 542, preferably a section or sections of the elongate portion 542 holding one or more lens elements, is permitted to move in response to a force applied by the windage or elevation actuators 300, 304. Accordingly, the mounting flange 566 and the elongate portion 542 are referred to herein as fixed and movable portions, respectively.

The mounting flange 566 is configured to cooperate with the main body 110 of the scope 500. For example, the interior surface 111 of the main body 110 may include a recess or channel that is configured to receive at least a portion of the mounting flange 566. The mounting flange 566 can remain securely affixed to the main body 110 so that generally the mounting flange 566 does not move relative to the main body 110 during operation of the positioning system 120. It is contemplated that a wide variety of arrangements can be employed to couple the erector tube 540 and the main body 110. Pins, ridges, threads, mechanical fasteners (e.g., nut and bolt assemblies), as well as other arrangements can be used to secure the erector tube 540 to the main body 110.

One-piece construction of the elongate tube 540 wherein the elongate portion 542 is integrally formed with the flexible portion 544 may offer advantages such as durability and reduced wear. The erector tube 540 may for example comprise a continuous, unitary generally tubular body that includes the elongate and flexible portions 542, 544. In such embodiments, the elongate portion 542 and/or the flex portion 544 of the erector tube 540 may be formed by machining, including but not limited to, laser cutting or machining techniques. Alternatively, casting or molding may be employed. Other methods of fabrication may also be used. In other embodiments, for example, the elongate portion and the flex portion 544 may be bonded, welded, or fused together.

The erector tube 540 may also comprise two or more pieces corresponding to the elongate portion 542 and the flexible portion 544 that are mechanically joined together to form the erector tube 540. In certain embodiments, for example, the proximal end 560 of the elongate portion 542 can be received within the distal end 546 of the flex portion 544 and affixed therein. Any suitable method can be used to secure the erector tube 540 to the flexible portion 544. For example, the erector tube 540 can be press fit, threadably coupled, or otherwise affixed to the flexible portion 544. Connectors may be employed in certain embodiments. Other methods of forming the erector tube 540 are possible as well.

The erector tube 540 may be biased toward the actuators 300, 304 (e.g., the windage and elevation screws) of the positioning system 120. The distal end 546 of the elongate portion 542 of the erector tube 540 can be laterally or radially offset or skewed with respect to a central longitudinal axis 575 of the main body 110. The distal end 546 may be off-center within the main tube 110 and may be displaced toward the windage and elevation dials 300, 304 and away from a portion of the sidewalls 111 of the main tube 110 opposite the windage and elevation screws. In some embodiments, the erector tube 540 may be bent, tilted, or shaped such that the distal end 546 of the elongate portion 542 is displaced laterally within main tube 110. This distal end 546 is preferably laterally displaced toward the position system 120 in comparison with the proximal end 560 of the elongate portion 542 of the erector tube 540.

Figure 17:
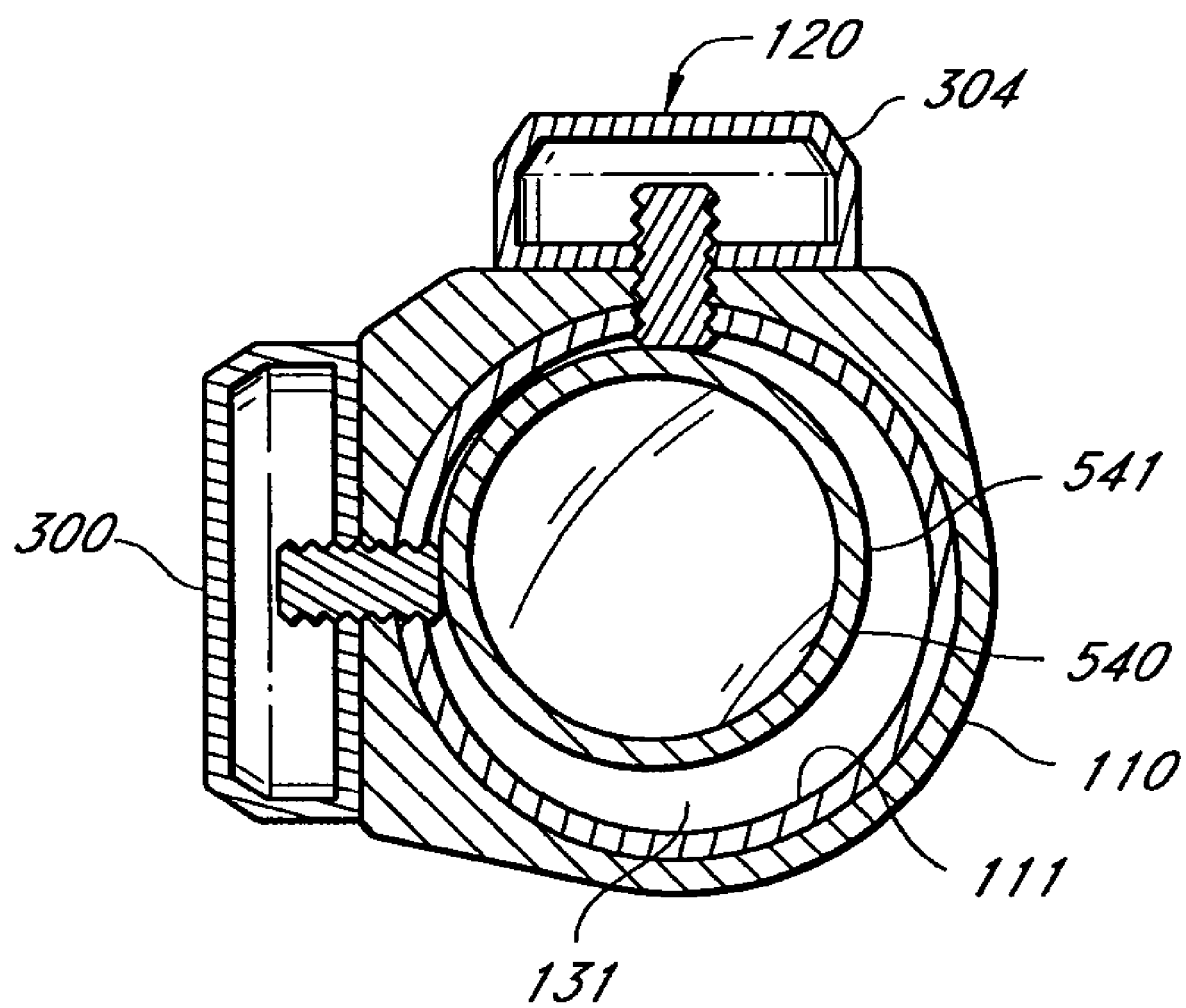
FIG. 17 is a cross-sectional view along the line 17-17 in FIG. 14 schematically illustrating the erector tube laterally offset toward the windage and elevation dials.

FIG. 17 depicts a portion of the erector tube 540 that is shifted toward the positioning screws in the positioning system 120. The flexible erector tube 540 is biased so as to apply a pressure against these screws. Accordingly, when the screws of the positioning system do not engage the erector tube 540, the distal end 546 of the erector tube 542 is in a position in the main body 110 offset toward the actuators 300, 304 and away from the portions of the main tube opposite the windage and elevation controls. The distal end 546, however, can be moved from this position to a desired location within the interior 131 of the main body 110 by applying a force against the elongate portion 542 of the erector tube 540 with the windage and elevation screws.

In some embodiments, springs disposed between the erector tube 540 and the main tube 110 are used to bias erectors towards screws of a windage/elevation system 120. These springs, however, limit the movement of the erector tube 540 because the springs occupy space within the inner region 131 of the main body 110 of the scope 500. The range of motion of the windage and elevation dials 300, 304 is thus limited by the presence of these springs, which can only be compressed to a finite extent.

In contrast, in the scope 500 illustrated in FIGS. 14-17, the erector tube 540 is biased toward the windage and elevation controls 300, 304 without the use of springs between the erector tube and the portions of the main tube 110 opposite the windage and elevation dials. Springs or other biasing elements are excluded from this region at the distal end 546 of the elongate portion 542 of the erector tube 540 between the exterior sidewalls 541 of the erector tube and the interior sidewalls 111 of the main tube 110.

The distance that the erector tube 540 can be displaced by the positioning system 120 toward the portions of the main tube 110 opposite the windage and elevation controls 300, 304 is increased by the absence of such springs. Similarly, the range of windage and elevation adjustment can thereby be increased. The distal end 546 of the erector tube 540 may, for example, be movable throughout substantially the entire portion of the interior region 131 between the exterior sidewall surfaces 541 of the erector tube 540 and the interior sidewall surfaces 111 of the main tube 110.

Biasing the erector tube without the use of springs or other complicated devices or structures also provides less variation in loading force against the windage and elevation adjustments, which may yield improved user adjustment feel. Jumping and sticking can also be reduced. Additionally, in some embodiments, for example, the force applied to the positioning system 120 is less than the force applied by the windage and elevation screws in spring-type systems so that the wear between the erector tube 540 and the positioning system 120 and fatigue of the positioning system 120 is reduced. Less overall force improves the operational adjustment torque for operating the adjustments, reducing wear on the adjustments and reducing production costs.

In certain embodiments, however, springs, mechanical actuators, biasing mechanisms, or other suitable devices can bias the erector tube 540 toward the windage and elevation dials 300, 304. Such springs may be used in scopes 500 with or without flexible erector housings 525. In one embodiment, for example, a spring can be interposed between the distal end 546 of the elongate portion 542 of the erector tube 540 and the main body 110 to further enhance the bias of the erector tube. In various embodiments of the scope 500, however, the erector tube 540 is flexible and the region between the distal end 546 of the erector tube and the main tube 110 is devoid of springs that apply force toward the windage and elevation screws.

When utilizing such a scope 500, the user can adjust the positioning system 120 to move the erector tube 540 to a desired position. The user can rotate the windage dial 300 which, in turn rotates the corresponding windage screw and laterally shifts the distal end 546 of the erector tube 540. As described above, the flexible portion 544 biases the erector tube 540 against the screw of the dial 300 as the screw actuates the erector tube 540. In the state of the positioning system 120 illustrated in FIG. 17, the screw of the windage dial 300 forces against the distal end 546 towards the opposite side of the main body 110. The connecting portion 582 flexes and the distal end 546 is moved horizontally.

Similarly, the user can rotate the elevational dial 304 which, in turn rotates the corresponding elevation screw and vertically shifts the distal end 546 of the erector tube 540. As described above, the flexible portion 544 biases the erector tube 540 against the screw of the dial 304 as the screw actuates the erector tube 540. In the state of the positioning system 120 illustrated in FIG. 17, the screw of the elevation dial 304 forces against the distal end 546 towards the opposite lower wall of the main body 110. The connecting portion 584 can flex as the distal end 546 is moved vertically.

Thus, as the screws of the dials 300, 304 are advanced through the main body 110, the screws can press upon the distal end 546 of the erector tube 540 to cause flexure of the flexible portion 544 of the erector tube 540. The optical train 126 is thereby moved to account for windage and/or elevation. Other methods of laterally translating the erector tube 540 and adjusting the optics train 126 are possible.

As described above, the erector tube 540 is preferably biased without the used of springs or other biasing elements between the exterior sidewall surfaces 541 of the erector tube 540 and the interior sidewall surfaces 111 of the main tube 110. The erector tube 540 can thus have an increased range of movement. This design may offer additional benefits as well. Other designs are also possible.

Figure 18:
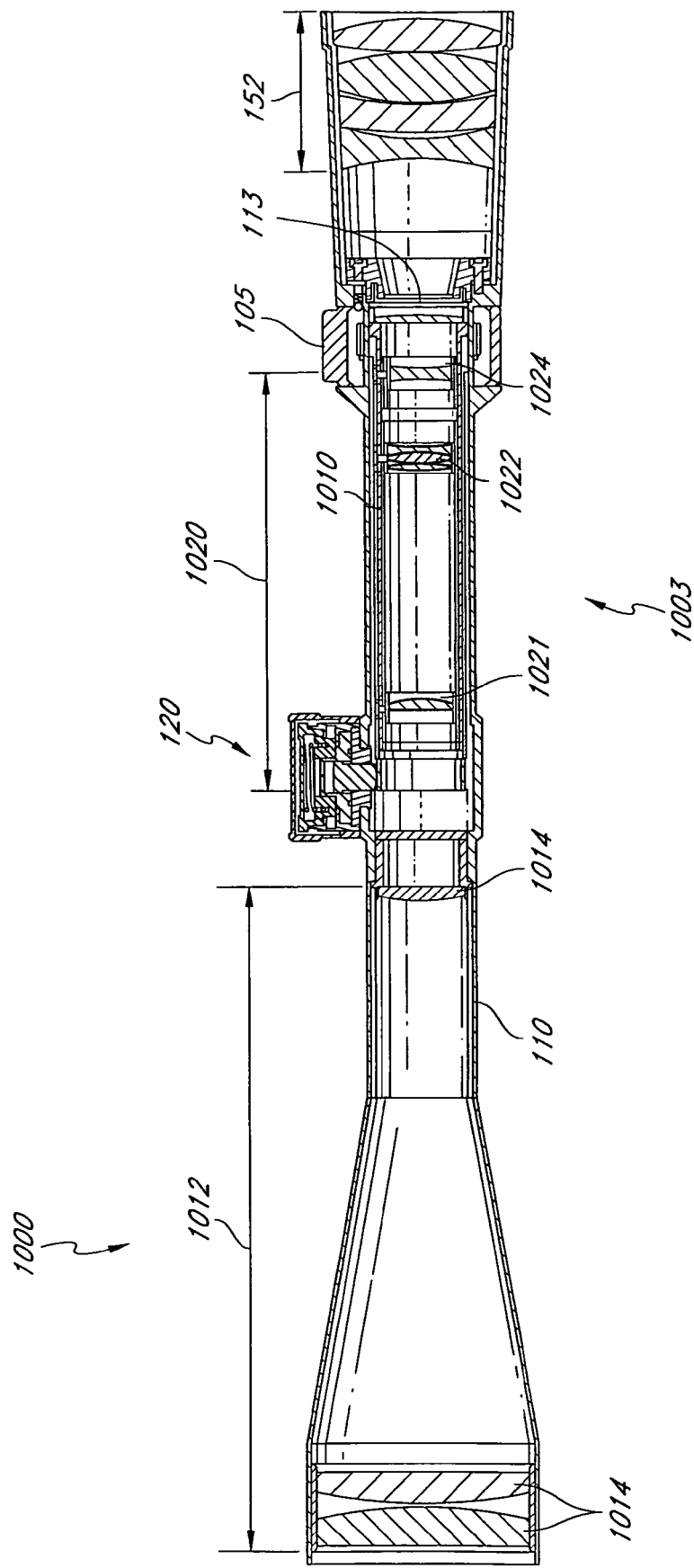
FIG. 18 is a cross sectional view of a scope in accordance with another embodiment including erector optics comprising a collector lens, a zoom lens group, and Barlow lens that provide increased zoom.
Figure 21:
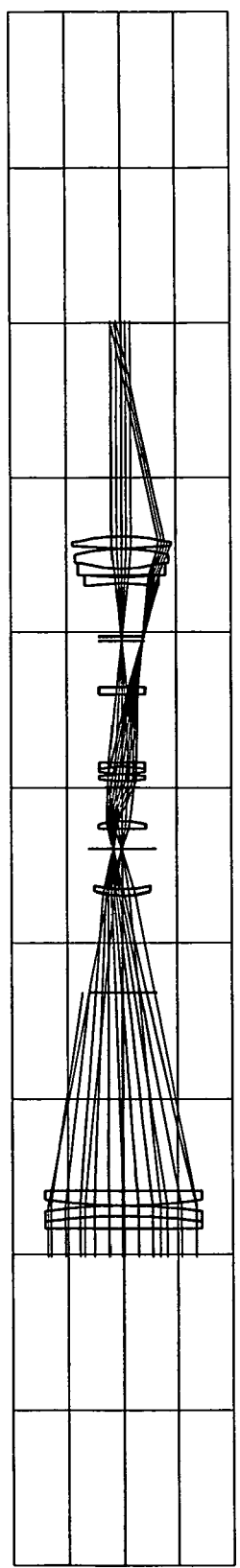
Figure 22:
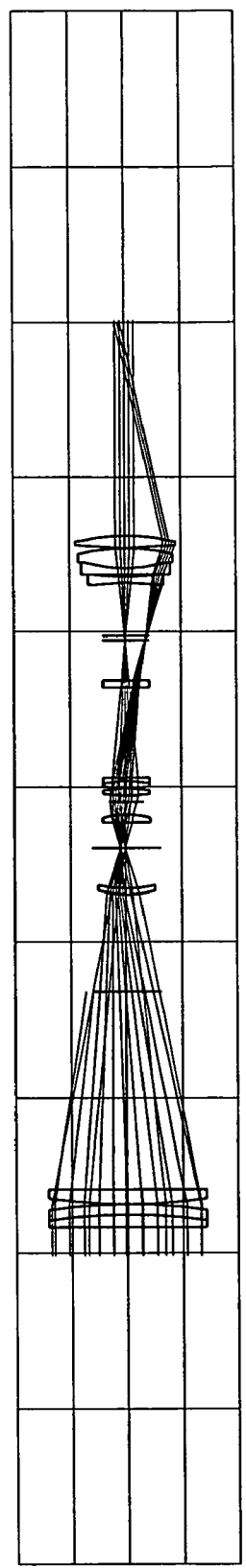
Figure 23:
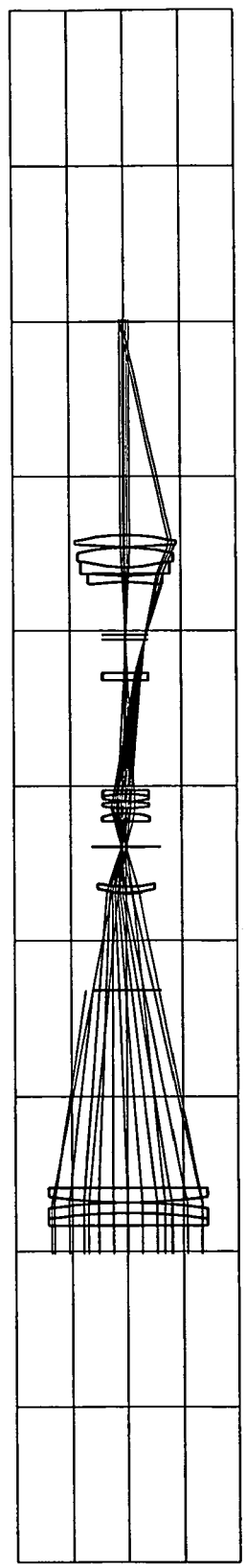

FIG. 18 illustrates another embodiment of a scope 1000 that may be generally similar to the embodiments illustrated in FIGS. 1-17, except as further detailed below. The scope 1000 includes a main body 110 that houses an optical train 1010 that includes an objective 1012 at one end and the ocular 152 at the other end. Between the objective 1012 and the ocular 152 is an erector assembly 1020 for providing an erect image. The erector assembly 1020 comprises a plurality of erector lens elements: a collector lens 1021, a zoom lens group 1022, and a Barlow lens 1024. This Barlow lens 1024 is a negative lens. The erector elements 1021, 1022, 1024 cooperate to offer magnification functionality and thus together form a zoom assembly 1003 that provides controllable zoom. The zoom assembly 1003 is configured to magnify the viewing image, preferably at high levels of magnification in some settings.

The level of zoom is adjustable by operating the zoom selector ring 105. The zoom selector ring 105 of the zoom assembly 1003 can be operated to move selectively one or more of the erector lens elements 1021, 1022, 1024, thereby controlling the paths of light passing through the scope 1000, preferably producing upright viewable images at different levels of magnification, or no magnification.

FIGS. 19-23 show various positions of the erector lens elements 1021, 1022, 1024 and the resulting paths of rays passing therethrough. As shown, the zoom lens group 1022 is translated forward in FIGS. 19-23 respectively thereby providing increased longitudinal magnification. The Barlow lens 1024 moves forward in FIG. 20 and progresses more rearward in FIGS. 22 and 23.

As shown in FIGS. 19-23, in various embodiments, the collector lens group 1021 is configured to collect rays from the pupil 1031, and may compensate for focus variations. The Barlow lens provides enhanced magnification preferably without substantially increasing the length of the scope 1000.

Alternative optical designs may be used. One or more of the components of the optical train 1010 can include one or a grouping of lenses. The objective 1012 and/or the ocular 152 each can comprise one or a group of lenses, for example. Similarly, the collector lens and/or the Barlow lens may comprise more than one lens element. The zoom lens group may include only one lens element in some embodiments. Any suitable number and configuration of lenses can be employed to achieve the desired ray paths. In the scope 1000, the illustrated objective 1012 comprises a plurality of lenses 1014 spaced apart from each other and positioned along the main body 110. Other configurations are possible.

Additionally, it is contemplated that erector lens elements can be added to or removed from the erector assembly 1020. For example, in one embodiment the erector assembly 1020 comprises more than three erector lens sections. The erector system 1020 may comprises a telephoto system, or other design suitable for providing increased magnification preferably without substantially increasing the length of the scope 1000. A skilled artisan can determine the spacing between the erector lens elements 1021, 1022, 1024 to achieve the desired magnification and focus of the image viewed through the scope 1000. Similarly, the curvature, materials, and thus type of lenses employed in the system may vary. A skilled artisan can select the desired prescription and lens types based on considerations including manufacturing requirements, desired performance such as magnification and the like.

Figure 24:
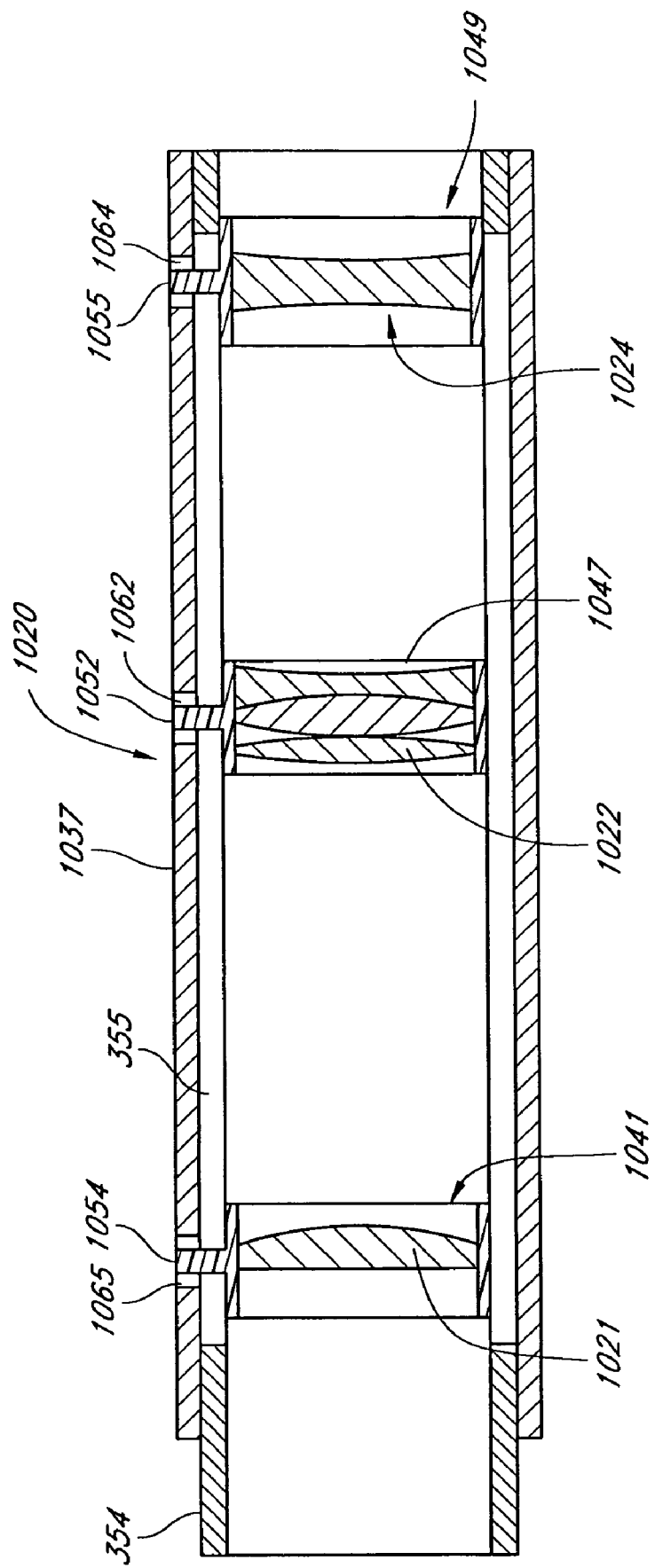
FIG. 24 is a cross sectional view of an erector assembly of the scope of FIG. 18 showing carriages for translating the collector lens, the zoom lens group, and the Barlow lens.

The erector assembly 1020 can be driven by the user to determine the relative positions between the collector lens 1021, the zoom lens group 1022, and the Barlow lens 1024 to achieve the desired magnification of the viewing image. In some embodiments, the erector assembly 1020 includes one or more translation elements that longitudinally translate the lens elements 1021, 1022, 1024. FIG. 24 for example shows the collector lens 1021 disposed on a translatable carriage 1041. This carriage 1041 includes a protruding member 1054 that is disposed within a cam 1065. Similarly, the zoom lens group 1022 and the Barlow lens 1024 are also disposed on translatable carriages 1047, 1049. These carriages 1047, 1049 include protrusions 1052, 1055, respectively, that are slidably retained within corresponding cams 1062, 1064.

Figure 25:
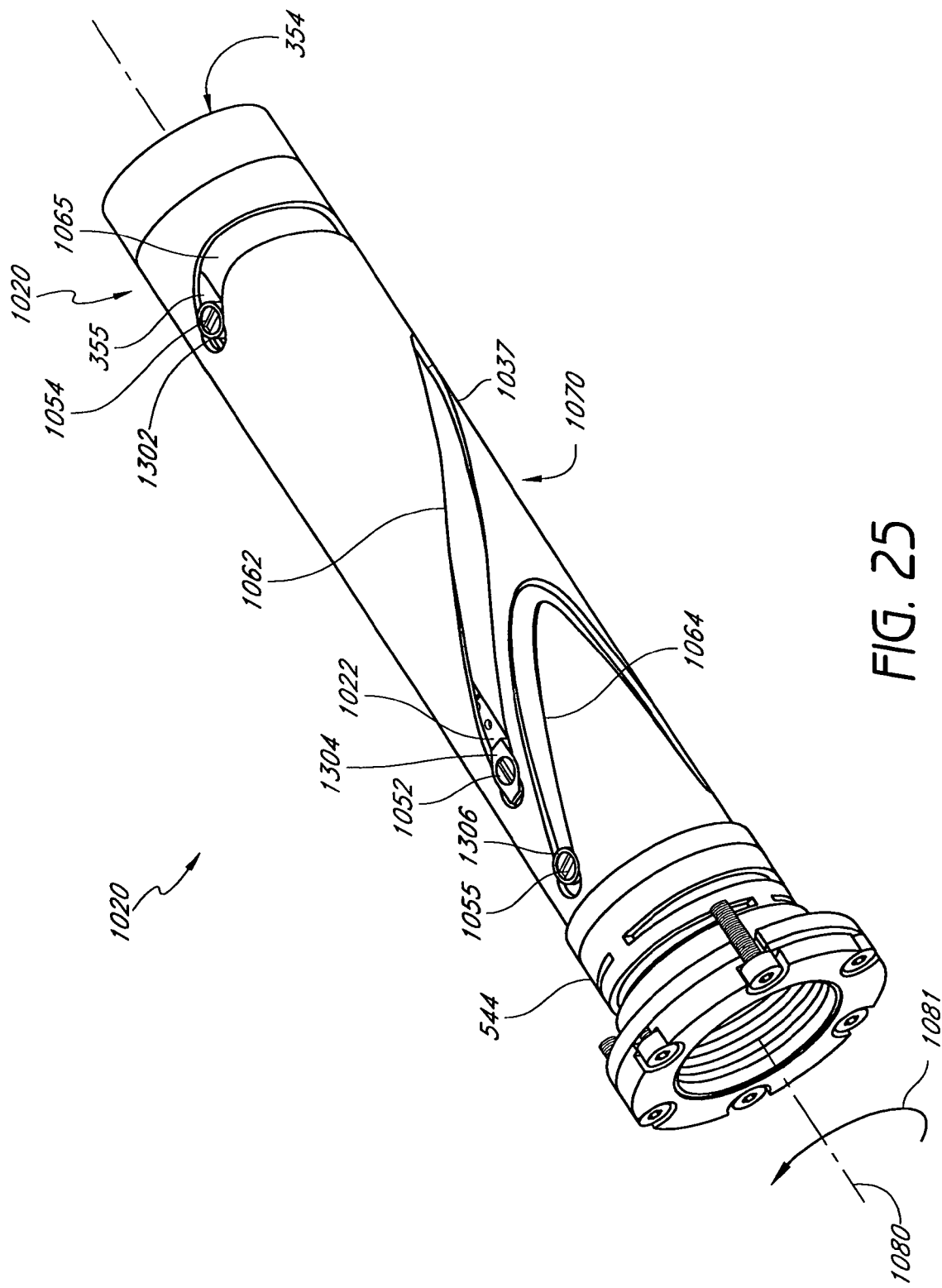
FIG. 25 is a perspective view of the erector assembly showing three cams for moving the carriages shown in FIG. 24.

As shown in FIG. 25, the erector assembly 1020 includes a housing 1070 that holds the carriages 1041, 1047, 1049. The illustrated housing 1070 comprises an outer tubular member 1037 defining the cams 1062, 1064, 1065. The inner tube 354 is disposed within the outer tubular member 1037. The inner tube 354 has an elongate slot 355 that extends between the cams 1062, 1064, 1065, and can be fixedly coupled to the main body 110.

One or more of the carriages 1041, 1047, 1049 slide within the housing 1070. The illustrated carriages 1041, 1047, 1049 are axially movable along the housing 1070. Alternatively, one or more of the carriages 1041, 1047, 1049 can be stationary relative to the housing 1070. For example, one or more of the carriages can be fixedly mounted within the housing 1070.

In the embodiment shown in FIG. 25, each of the carriages 1041, 1047, 1049 is movably connected to the corresponding cam 1065, 1062, 1064 through the respective protruding member 1054, 1052, 1055. As shown in FIG. 24, the protruding members 1054, 1052, 1054 extends outwardly through the inner and outer tubes 354, 1037. In the illustrated embodiment, the protruding members 1054, 1052, 1055 extend through the slot 355 and the cams 1064, 1062, 1065, respectively. In some embodiments, outer members can surround the protruding members 1054, 1052, 1055 to reduce frictional forces between the protruding members and the cams. In the embodiment shown in FIG. 25, for example, outer members 1302, 1304, 1306 surround the protruding members 1054, 1052, 1055, and can be made of polymers, plastic, metal, or other material that can engage the cams 1065, 1062, 1064. The shape, size, and location of the cams 1065, 1062, 1064 determine the relative positions between each of the carriages 1041, 1047, 1049 and erector lens elements 1021, 1022, 1024 disposed thereon. When the outer tube 1037 is rotated relative to the inner tube 354, the carriages 1041, 1047, 1049 are linearly displaced along the housing 1070.

As shown in FIG. 25, the cam 1065 for the collector lens 1021 is an elongated curved slot that is somewhat U-shaped so that the erector lens element 1021 moves distally and then proximally as the outer tubing 1037 rotates. The cam 1062 for the zoom lens group 1022 is a somewhat spirally shaped so that the distance of travel per rotation of the erector lens elements 1022 is substantially linear with respect to the angle of rotation. The cam 1064 for the Barlow lens 1024 is configured to move the erector lens element distally and then proximally and is somewhat V-shaped. The cams 1062, 1064, 1065 can have other shapes to obtain any desired positioning of the erector lens elements 1021, 1022, 1024.

Figure 26:
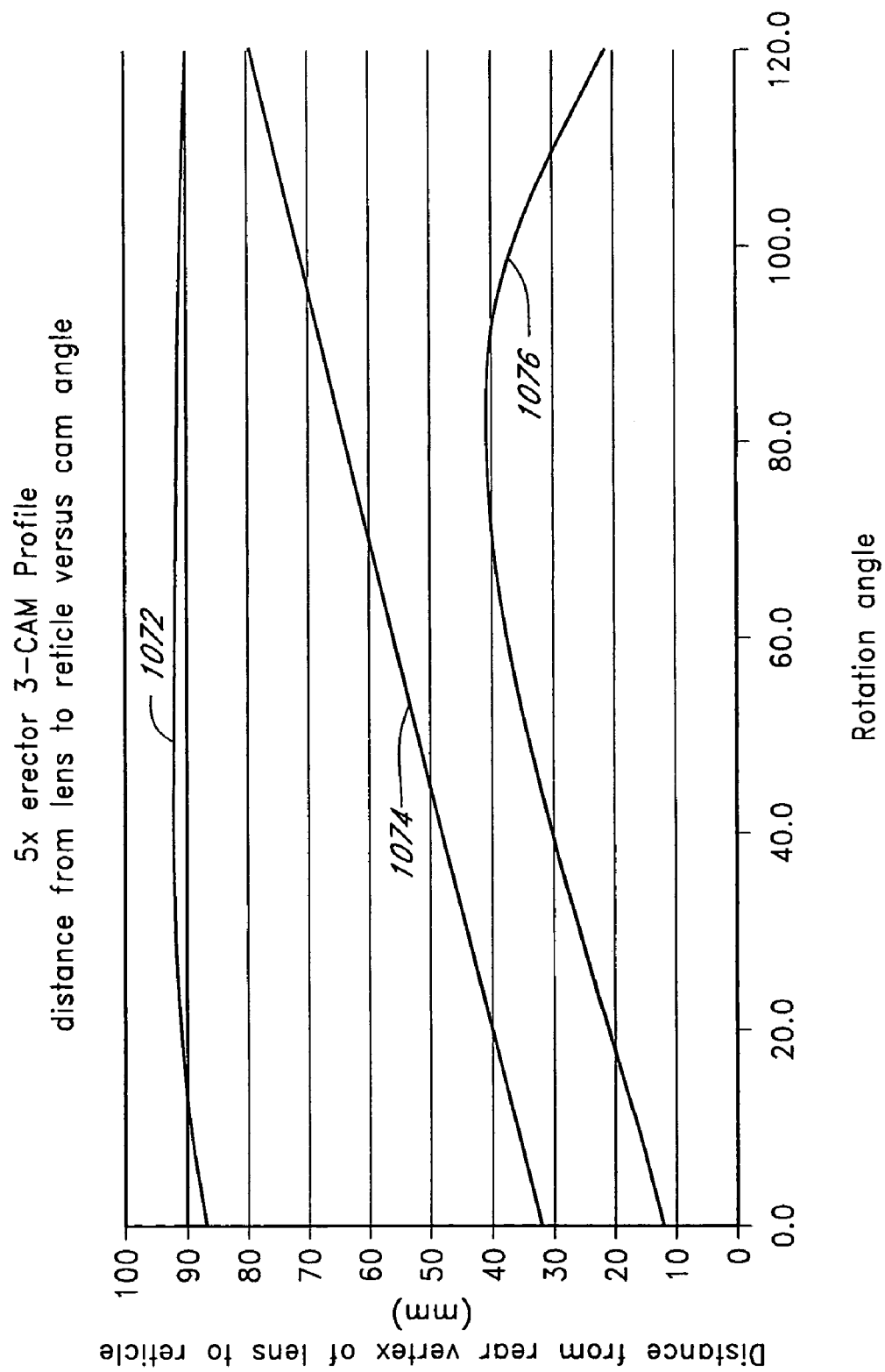
FIG. 26 is a plot of distance from lens to a reticle versus a rotational angle of the zoom selector ring for the collector lens, the zoom lens group, and the Barlow lens in a scope having 5× longitudinal magnification.

FIG. 26 is plot that shows the distance from the rear vertex of the lens to the reticle 113 versus the rotation angle of the cams 1062, 1064, 1065 of the outer tube 1037. Curve 1072 shows the longitudinal displacement of the collector lens 1021 with rotation of the outer tube 1037. Curve 1074 shows the axial displacement of the zoom lens group 1022 with rotation of the outer tube 1037, and curve 1076 shows the longitudinal displacement of the Barlow lens 1024 with rotation of the outer tube 1037.

FIG. 25 depicts the outer tube 1037 at a rotation angle of about 0.0. The outer tube 1037 is rotated counter-clockwise, as viewed proximally and indicated by the arrow 1081, about the axis 1080 to increase the rotation angle. This motion increases the magnification of the viewing image. The rate of travel of the erector lens elements 1021, 1022, 1024 along the axis of the erector assembly 1020 can be increased or decreased as desired by increasing or decreasing, respectively, the rotational speed of the outer tube 1037 or the angle of the respective cam 1065, 1062, 1064. The illustrated erector assembly 1020 is designed to provide 5× magnification. A skilled artisan can select the design of the erector lens elements 1021, 1022, 1024 and the outer tube 1037 to achieve the desire magnification functionality.

Other designs, however, are possible. The housing 1070 illustrated in FIG. 25 has three cams 1065, 1062, 1064 in the form of elongated slots. However, any suitable number of cams can be formed in the housing 1070. The cams can be interconnected or separated from each other. The shape and location of the cams determine the spacing between the erector lens elements 1021, 1022, 1024, which may be different. Similarly, the number of carriages 1041, 1047, and 1049 may be different. Moreover, the elements on the carriages 1041, 1047, 1049 may vary. For example, one or more elements may be included in the erector assembly that are not disposed on one of the carriages 1041, 1047, and 1049. Still other designs configurations may be used.

The use of a zoom assembly 1003 with three translation stages 1041, 1047, and 1049, three cams 1062, 1064, 1065, and three erector optics sections 1021, 1022, 1024 offers advantages. Some scopes described above comprise two lens groups in the erector assembly for directing light rays, a collector lens group and a zoom lens group. These two lens groups can be moved relative to each other to generate zoom, normally less than four times zoom. In contrast, the illustrated scope 1000 shown in FIGS. 18-23 can have 4× zoom or more by having a plurality, preferably more than two, erector lenses that are movable relative to each other. Advantageously, the scope 1000 can provide increased magnification without substantially increasing the overall length of the scope. In some non-limiting exemplary embodiments, the scope 1000 has an erector lens length that is less than about eight inches, seven inches, six inches, five inches, four inches, three inches, and ranges encompassing such lengths. The ranges and embodiments disclosed herein are given by way of example only and are not intended to limit the scope of the disclosure in any way. The illustrated erector assembly 1020 provides more than 4× zoom with an erector length of about 4 inches or less. In some embodiments, the scope 1000 is configured to provide 4× zoom or more, 5× zoom or more, 6× zoom or more, 8× zoom or more, and 10× zoom or less. In some non-limiting embodiments, a scope having an erector assembly with a length between 3 inches and 5 inches, more preferably about 4.25 inches, has 5× zoom. A scope having an erector assembly having a length between 6 inches and 7 inches, more preferably about 6.5 inches, has about 6× zoom. A scope having an erector assembly having a length between 6 inches and 8 inches, more preferably about 7 inches, has about 8× zoom. A scope having an erector assembly having a length between 7 inches and 9 inches, more preferably about 8 inches, has about 10× zoom. However, other sizes of erector assemblies and amounts of magnification can be achieved as desired. For example, the length of the erector assembly can selected based on the desired performance, image quality, zoom capability, and other design parameters. As such, the zoom capability and size of the erector assembly of the scope can be different than those disclosed herein.

The adjustable distance between the collector lens 1021 and the Barlow lens 1024 can be selected for a desired zoom capability. In some embodiments, the maximum distance between the collector lens 1021 and the Barlow lens 1024 is less than about 8 inches, 7 inches, 6 inches, 5 inches, 4 inches, 3 inches, 2 inches, and ranges encompassing such distances. The distance spanned by the collector lens 1021, zoom lens 1022 and the Barlow lens 1024 can be selected based on the desired magnification functionality. In some embodiments, for example, the scope 1000 has more than about 4× zoom capability wherein the distance between the collector lens 1021 and the Barlow lens 1024 is less than about 4 inches. The distance between the collector 1021 and Barlow lens 1024 can vary between about 2 inches and 3 inches. In some embodiments, the distance between the collector 1021 and Barlow lens 1024 can vary between about 2.25 inches to about 2.90 inches. In such embodiments, the overall image to image length of can be in the range of about 4 inches to about 4.5 inches, preferably about 4.25 inches. In some embodiments, the distance between the collector 1021 and Barlow lens 1024 can vary between about 1.5 inches and 3.5 inches, 1.75 inches and 2.75 inches, or 2.0 inches and 2.5 inches. The spacing of the lenses can be selected based on the optical characteristics of the lenses, desired image quality, zoom functionality, and the like and, consequently, the above distances are given by way of example and do not limit the present disclosure.

In operation, the zoom selector ring 105 is drivingly connected to the carriages 1041, 1047, and 1049. The user can manually rotate the zoom selector ring 105 to rotate the outer tube 1037 which causes movement of the carriages 1041, 1047, and 1049 relative to one another. By adjusting the angular position of the zoom selector ring 105, the user can conveniently control the level of magnification.

As described above, the design and configuration of the scope including can be different. In fact, a wide variety of variations are possible. For example, the shape and contour the scope and its components may be different to provide a different look and/or feel. Internal features may also be configured differently. For example, a flexible erector tube need not be used or if use, springless-bias need not be provided. The main tube need not be continuous. For example, either or both of the objective end 116 and the eyepiece end 118 may have threading and may be screwed to the central body portion. Different types of mechanical connections may be used in the scope. The positioning system may be different; other configurations can provide for movement of the erector assembly.

Moreover, additional components can be added, components can be removed, arranged or configured differently, in the scope as well as in the position system of the scope. Similarly, the methods which are described and illustrated herein are not limited to the exact sequence of acts described, nor is it necessarily limited to the practice of all of the acts set forth. Other sequences of events or acts, or less than all of the events, or simultaneous occurrence of the events, may be utilized in practicing the embodiments of the invention. Additional events or acts may be added. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A scope for sighting including an objective end and an ocular end, the scope comprising:
    a movable zoom selector for adjusting magnification of an image viewed through the scope;
    an objective lens proximate the objective end;
    an ocular lens proximate the ocular end; and
    an erector assembly positioned between the objective lens and ocular lens, the erector assembly comprising at least three optical elements movable in response to operation of the zoom selector such that the distance between each of the optical elements is changed.

2. The scope of claim 1, further comprising:
    at least one additional objective lens distal from the objective end of the scope, wherein the additional objective lens is located between the first objective lens and the erector assembly;
    wherein the at least three optical elements of the erector assembly cooperate to provide at least 4× zoom of a target viewed through the scope.

3. The scope of claim 2, wherein the at least three optical elements cooperate to provide at least 5× zoom of a target viewed through the scope.

4. The scope of claim 3, wherein the at least three optical elements span a distance that is equal to or less than about 5 inches.

5. The scope of claim 4, wherein the at least three optical elements span a distance that is equal to or less than about 4 inches.

6. The scope of claim 1, further comprising at least three carriages supporting said at least three optical elements, said three carriages being longitudinally translated in response to operation of the zoom selector.

7. The scope of claim 1, further comprising an erector housing comprising an inner tube and an outer tube surrounding the inner tube, the outer tube having a front slot, a central slot, and a rear slot, the at least three optical elements comprise a first erector element, a second erector element, and a third erector element, a front carriage carrying the first erector element is slidably retained in the front slot, a central carriage carrying the second erector element is slidably retained in the central slot, and a rear carriage carrying the third erector element is slidably retained in the rear slot, and the front, central, and rear carriages are disposed within the inner tube.

8. The scope of claim 7, wherein the front carriage, central carriage, and rear carriage move axially along the erector housing when the zoom selector is rotated.

9. The scope of claim 7, wherein the first erector element comprises a collector lens, the second erector element comprises a lens, and the third erector element comprises a Barlow lens.

10. The scope of claim 7, wherein the third erector element comprises a negative lens.

11. The scope of claim 1, wherein the movable zoom selector is a rotatable ring connected to the erector assembly such that rotation of the ring longitudinally displaces the at least three optical elements.

12. The scope of claim 1, wherein at least one of the three optical elements comprises a Barlow lens.

13. A scope for sighting, the scope comprising:
    a movable zoom selector for adjusting magnification of an image viewed through the scope;
    an objective;
    an ocular;
    an erector assembly positioned between the objective and ocular, the erector assembly comprising:
        at least three optical elements;
        at least three separate carriages supporting said at least three optical elements and
        a tube having at least three cams, said at least three separate carriages being slidably engaged to said at least three cams such that rotation of said tube induces longitudinal movement of said carriages and said optical elements.

14. A scope for a firearm, the scope comprising:
    an elongate main body; and
    an erector assembly disposed within the main body, the erector assembly comprising:
        a collector lens;
        a zoom lens;
        a Barlow lens; and
        an erector housing defining at least three elongate cams, movement of the collector lens, zoom lens, and Barlow lens each being guided by one of the elongate cams.

15. The scope of claim 14, further comprising a collector lens carriage carrying the collector lens, a zoom lens carriage carrying the zoom lens, and a Barlow lens carriage carrying the Barlow lens, wherein the collector lens carriage, zoom lens carriage, and Barlow lens carriage are guided by the corresponding cams.

16. The scope of claim 14, further comprising a zoom selector ring connected to the erector assembly such that the collector lens, zoom lens, and Barlow lens move relative to one another as the zoom selector ring is rotated.

17. The scope of claim 16, further comprising:
an objective;
an ocular; and
wherein the elongate cam that guides the collector lens is substantially U-shaped, the elongate cam that guides the zoom lens is substantially spirally shaped, and the elongate cam that guides the Barlow lens is substantially V-shaped.

18. The scope of claim 17, wherein the open end of the substantially U-shaped elongate cam and the open end of the substantially V-shaped elongate cam face the same direction.

19. The scope of claim 18, wherein the open end of the substantially U-shaped elongate cam and the open end of the substantially V-shaped elongate cam face the ocular.

20. The scope of claim 14, further comprising:
at least one additional lens distal from an objective end of the scope, wherein the additional lens is located between an objective lens proximate the objective end of the scope and the erector assembly;
wherein the scope has more than about 4× zoom capability of an object viewed through the scope.

21. The scope of claim 20, wherein the maximum distance between the collector lens and the Barlow lens is less than about 6 inches.

22. The scope of claim 20, wherein the maximum distance between the collector lens and the Barlow lens is less than about 4 inches.

23. The scope of claim 14, wherein the scope has more than about 5× zoom capability of a target viewed through the scope.

24. The scope of claim 14, wherein the scope has more than about 7× zoom capability of a target viewed through the scope.

25. A scope for sighting, the scope comprising:
an objective lens group;
an ocular lens group;
an erector assembly positioned between the objective lens group and ocular lens group, the erector assembly comprising at least three spaced-apart optical elements, wherein each of at least two of the optical elements of the erector assembly is moveable relative to the other optical elements and the objective lens group is configured to produce an inverted image between the objective and the erector assembly and wherein the erector assembly is configured to erect the inverted image; and
at least one additional lens located between the objective lens group and the erector assembly;
wherein the scope has more than about 5× zoom capability of a target viewed through the scope.

26. The scope of claim 25, wherein:
the scope includes a riflescope;
the erector assembly includes a zoom lens group, a Barlow lens, and a third lens element;
the third lens element of the erector assembly is positioned between the objective lens group and the zoom lens group;
the Barlow lens of the erector assembly is positioned between the zoom lens group and the ocular lens group;
the third lens element and the zoom lens group of the erector assembly are each movable in response to operation of a zoom selector relative to each other and the Barlow lens such that the spacing between the third lens element and the zoom lens group and the spacing between the zoom lens group and the Barlow lens are differentially variable in response to operation of the zoom selector to provide the more than about 5× zoom capability of a target viewed through the scope; and
wherein the overall length of the erector lens assembly is less than 8 inches and the distance between the third lens element and the Barlow lens is greater than about 1.5 inches across the entire range of adjustment of the zoom selector.

27. The scope of claim 26, wherein the maximum distance between the third lens element and the Barlow lens across the entire range of adjustment of the zoom selector is less than about 5 inches.

28. The scope of claim 26, wherein the Barlow lens includes multiple lens elements.

29. The scope of claim 26, wherein the Barlow lens is movable in response to operation of the zoom selector.

30. The scope of claim 25, wherein one of the optical elements of the erector assembly includes a negative lens and the negative lens is not moveable.

31. The scope of claim 30, wherein:
one of the optical elements of the erector assembly includes a collector lens;
another of the optical elements of the erector assembly includes a zoom lens; and
the erector assembly optical elements are arranged so that the collector lens is proximal to the objective lens group, the zoom lens is between the collector lens and the negative lens, and the negative lens is proximal to the ocular lens group.

32. The scope of claim 31, wherein the negative lens includes a Barlow lens.

* * * * *

UNITED STATES PATENT AND TRADEMARK OFFICE
CERTIFICATE OF CORRECTION

| | |
|---|---|
| PATENT NO. | : 7,684,114 B2 |
| APPLICATION NO. | : 11/339992 |
| DATED | : March 23, 2010 |
| INVENTOR(S) | : Mark Thomas |

It is certified that error appears in the above-identified patent and that said Letters Patent is hereby corrected as shown below:

In column 9, line 47, replace "it" with --its--.

In column 9, line 52, delete the word "a".

In column 10, line 62, delete the word "of".

In column 12, line 24, after "may", insert --be--.

In column 12, line 39, replace "versus" with --versa--.

In column 21, line 7, replace "extends" with --extend--.

In column 22, line 4, replace "designs" with --design--.

In column 22, line 40, after "can", insert --be--.

In column 23, line 13, delete the word "including".

In column 23, line 14, after "contour", insert --of--.

In column 23, line 18, replace "or if use," with --or, if used,--.

Signed and Sealed this

Eleventh Day of May, 2010

David J. Kappos
*Director of the United States Patent and Trademark Office*